(12) United States Patent
Skoler

(10) Patent No.: US 11,508,208 B2
(45) Date of Patent: *Nov. 22, 2022

(54) SYSTEM AND METHOD FOR ON-LINE GAME BASED ON CONSUMER WISH LIST

(71) Applicant: Transform SR Brands LLC, Hoffman Estates, IL (US)

(72) Inventor: Frederick W. Skoler, Barrington, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/134,616

(22) Filed: Dec. 28, 2020

(65) Prior Publication Data

US 2021/0150852 A1 May 20, 2021

Related U.S. Application Data

(63) Continuation of application No. 14/800,111, filed on Jul. 15, 2015, now Pat. No. 10,922,917.

(51) Int. Cl.
*G07F 17/32* (2006.01)
*G06Q 30/02* (2012.01)

(52) U.S. Cl.
CPC ..... *G07F 17/3227* (2013.01); *G06Q 30/0242* (2013.01); *G06Q 30/0253* (2013.01); *G07F 17/3239* (2013.01); *G07F 17/3255* (2013.01); *G07F 17/3269* (2013.01); *G07F 17/3286* (2013.01)

(58) Field of Classification Search
CPC ............. G07F 17/3227; G07F 17/3239; G07F 17/3255; G07F 17/3269; G07F 17/3286
See application file for complete search history.

(56) References Cited

U.S. PATENT DOCUMENTS

| 2004/0014515 | A1  | 1/2004 | Tracy et al. |
| 2005/0153773 | A1* | 7/2005 | Nguyen ............... G07F 17/3244 463/25 |
| 2008/0154632 | A1  | 6/2008 | Jacobi et al. |
| 2014/0278990 | A1* | 9/2014 | Swanson ............ G06Q 30/0207 705/14.55 |

OTHER PUBLICATIONS

Examiner's Requisition Canadian Appln No. 2,936,121 dated May 4, 2020.
Examiner's Requisition Canadian Appln. No. 2,936,121 dated May 10, 2017.
Examiner's Requisition Canadian Appln. No. 2,936,121 dated Apr. 12, 2018.
Mexican Official Action Appln No. MX/a/2016/009277 dated Aug. 17, 2021.
Examiner's Requisition Canadian Appln No. 2,936,121 dated Jan. 14, 2022.

* cited by examiner

*Primary Examiner* — Thomas H Henry
(74) *Attorney, Agent, or Firm* — McAndrews, Held & Malloy, Ltd.

(57) ABSTRACT

A system and method for assessing personal preferences and interests of end-users by engaging one or more end-users in a game in which the end-user may be given a chance to win a product item from a collection of product items selected by the end-user.

18 Claims, 33 Drawing Sheets

SYSTEM AND METHOD FOR ON-LINE GAME BASED ON CONSUMER WISH LIST

CROSS-REFERENCE TO RELATED APPLICATIONS/INCORPORATION BY REFERENCE

The present application is a continuation of U.S. patent application Ser. No. 14/800,111, filed Jul. 15, 2015. The above-identified application is hereby incorporated by reference herein in its entirety.

This application hereby makes reference to U.S. patent application Ser. No. 13/956,978, filed Aug. 1, 2013, and U.S. patent application Ser. No. 14/321,450, filed Jul. 1, 2014, the subject matter of each which is hereby incorporated herein by reference, in its respective entirety.

FIELD

Certain embodiments of the present disclosure relate to systems and methods for gauging consumer interest in products. More specifically, certain aspects of the present disclosure relate to systems and methods for assessing consumer preferences and interests by engaging the consumer in a game in which the consumer may be given a chance to win a product chosen by the consumer from a collection of items selected by the consumer.

BACKGROUND

While shopping on-line, consumers frequently place products of interest in a collection of product items such as those added to a "wish list" or marked by the consumer "for later purchase." The degree and nature of the interest of the consumer in each of the product items in the collection is normally difficult to determine. In some cases, a consumer may use the collection as a parking place for products that may only be of passing interest to the consumer. In other cases, a consumer may add a product item in which they have a strong personal interest. In yet other cases, a consumer may use the collection simply as a place to hold product items that they have chosen as a potential gift for a friend or family member, and in which the consumer has no other personal interest.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method for assessing consumer preferences and interests by engaging the consumer in a game in which the consumer may be given a chance to win a product chosen by the consumer from a collection of items created by the consumer, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
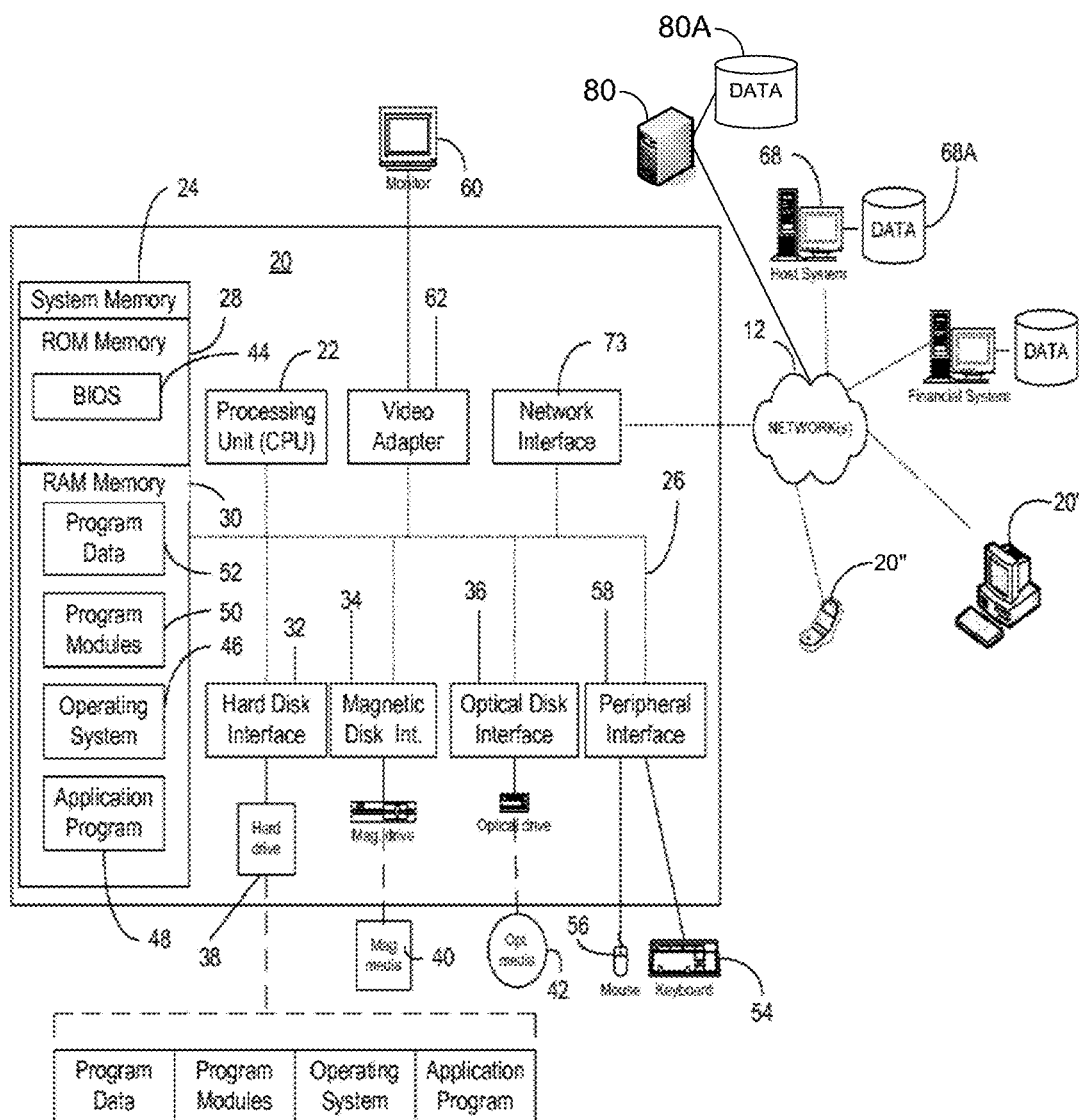
FIG. 1 is an illustration of exemplary computer network in which a representative embodiment of the present disclosure may be practiced.

Aspects of the present disclosure relate to systems and methods for gauging consumer interest in products. More specifically, certain aspects of the present disclosure relate to systems and methods for assessing consumer preferences and interests by engaging the consumer in a game in which the consumer may be given a chance to win a product chosen by the consumer from a collection of items created by the consumer.

The following description of example methods and apparatus is not intended to limit the scope of the description to the precise form or forms detailed herein. Instead the following description is intended to be illustrative so that others may follow its teachings.

The terms "customer," "consumer," "end-user," and "user" may be used herein interchangeably to refer to a potential or existing purchaser of products and/or services of a business.

The terms "merchant" and "sponsoring merchant/merchants" may be used herein to refer to the owner and/or operator of a business enterprise that operates either or both of traditional "brick-and-mortar" business locations or an e-commerce or social e-commerce platform as described herein, or enters into an agreement with another to operate such a platform on their behalf.

The term "loyalty program" may be used herein to refer to a structured marketing effort that rewards, and therefore encourages, loyal buying behavior that is potentially beneficial to the business or firm operating or sponsoring the loyalty program.

The term "member" may be used herein to refer to those consumers that have provided personal information to an operator or sponsor of a loyalty program in order to gain access to benefits provided by the loyalty program.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

The term "e-commerce" may be used herein to refer to business or commerce that is transacted electronically, as over the Internet.

The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "catalog" may be used herein to refer to a collection of information about things. In some representative embodiments of the present invention, a user may, for example, create their own catalog by, for example, selecting/clicking-on a "Create catalog" button on a web page, and may add a particular product to their "catalog" by, for example, selecting/clicking-on an "Add to catalog" button on a web page for the particular product.

The term "sweepstakes" may be used herein to refer to any activity having a prize the winner of which is selected at random from the entrants. In an embodiment of the present disclosure, a player may be qualified for entry as one of a population of players, all of whom play for a prize specified by a sponsor/operator of the sweepstakes. The "winner" of the sweepstakes game may be chosen at random from the population of all players that have qualified for entry prior to a specified date and time in the future. The randomly selected winner may then be awarded the specified prize on the specified date and time. The prize may be, by way of example and not limitation, a monetary amount prize, a product prize, and/or a prize consisting of a specified amount of loyalty or rewards "points" of a loyalty program of a merchant or group of merchants sponsoring/operating the sweepstakes game.

The term "instant win" may be used herein to refer to a game in which a player may be qualified for an immediate chance to win a prize, during a certain period of time of operation of the instant win game. The prize may be one prize instance of a designated number of prize instances each having a prize value within a particular range of prize values, and qualification for a chance to win may be based on rules governing the award of a prize. For example, in one embodiment of the present disclosure, a player may be chosen as a prize winner based on times and dates assigned to a "win" event corresponding to each of the designated number of prize instances, where the "win" events are each assigned a date and time that is randomly distributed within the certain period of time of the "instant win" game. In such an embodiment, the player is awarded a prize if the player qualifies for the "instant win" game at or after the date and time assigned to any "win" event has transpired, if no other player has been awarded a prize for that "win" event.

As utilized herein, the terms "exemplary" or "example" means serving as a non-limiting example, instance, or illustration. As utilized herein, the term "e.g." introduces a list of one or more non-limiting examples, instances, or illustrations.

The methods and systems disclosed herein may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or those later designed.

FIG. 1 is an illustration of exemplary computer network in which a representative embodiment of the present disclosure may be practiced. The following discloses various example systems and methods for, by way of example and not limitation, assessing consumer preferences and interests by engaging the consumer in a game in which the consumer may be given a chance to win a product chosen by the consumer from a collection of items created by the consumer.

Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("MAI cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The system memory 24, ROM 28, RAM 30, or a hard disk, magnetic disk, optical disk, or flash memory-based mass storage device accessible via the suitable hard disk drive interface 32, the magnetic disk drive interface 34, or optical disk drive interface 36, may be specifically configured to store data, parameters, program modules and/or executable instructions used by the processes, methods, and procedures described herein. The drive interfaces 32, 34, 36 and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities and hardware interfaces suitable to perform the methods and processes described herein. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, identifying and recommending product items; coordinating storage and retrieval of documents; maintaining social network storage of a shopping list; receiving a location of a customer via a mobile device; and maintaining maps and layouts of buildings and geographic areas. In addition, the host system 68 may include executable instructions for, among other things, calculating directions or routes within buildings and geographic areas; searching, retrieving, and analyzing web-based content; managing operating rules and communication with user devices used by participants in a multiplayer consumer game; and for receiving a request for a service call center connection from either a customer or a sales associate. The host system 68 may further include executable instructions for, among other things, routing a received request via a distributed mobile video call center; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

The illustration of FIG. 1 also includes a computer system 80 and associated non-transitory computer-readable media 80A that is specifically configured to store data, parameters, and/or executable instructions necessary to perform the actions of the inventive concepts described herein below.

When an end-user browses on-line web sites of merchants, referred to herein as "e-commerce" or 'social e-commerce' web sites, the end-user may come upon one or more product items that interest them. Many such web sites include some form of user interface element such as, for example, a "Want" button or icon, a "Save For Later" button or icon, or the ability to create one or more "Personal Catalogs" that may appear as personal web pages containing images and/or descriptions of product items the end-use likes or wants. The "Want" button/icon, "Save For Later" button or icon, and "Personal Catalog" permit the end-user to express their interest in particular product(s) that they are not necessarily immediately ready to purchase, but for which they would like to have information saved for use later in possibly making an actual purchase.

Some social e-commerce web sites may offer promotional activities to their end-users or members and may, for example, provide promotional activities in the form of, by way of example and not limitation, one or more games such as "sweepstakes". Sweepstake-type games typically begin and end on specified start and end dates, and have a designated prize that is awarded after the sweepstakes end date, which is set to some point in time days, weeks, or even years after the start date. In such promotional game, an end-user or member may qualify for and be given a chance to be awarded the prize which may be, by way of example and not limitation, a product item, a certain amount of what may be referred to herein as "reward points" that are redeemable for merchandise, or other suitable things of value that have been selected by the operator or sponsor of the sweepstakes promotional activity. The sponsor or operator of the promotional game activity may be, by way of example and not limitation, a merchant, a manufacturer, a non-profit organization, or many other entities. An example of a system and method that supports the operation of promotional activities such as contests and sweepstakes is described in detail in U.S. patent application Ser. No.

13/956,978, entitled "Contests and Sweepstakes," filed Aug. 1, 2013, the complete subject matter of which is hereby incorporated by reference herein, in its entirety. A system and method for supporting the creation and management of large numbers of concurrent promotional activities such as contests and sweepstakes may be found in U.S. patent application Ser. No. 14/321,450, entitled "Methods and Systems for an E-Commerce Promotions Platform," filed Jul. 1, 2014, the complete subject matter of which is hereby incorporated by reference herein, in its entirety. Such systems are useful as significant issues arise when attempts are made to operate a large number of promotional game activities like, for example, sweepstakes, when the tools used by operators or sponsors to create and manage operation of sweepstakes, and the end-user interfaces used by players are accessible over the Internet to a potentially large population. Such issues are unique to the creation and delivery of the herein described promotional game activities via the Internet, due to the rapidity with which the promotional game activities can be created and taken down, the large number of active promotional game activities that can concurrently exist, and the ease with which large numbers of player participants can engage the systems that support the promotional game activities.

One representative embodiment of the present disclosure may be found in a form of a sweepstakes promotional game that offers the end-user an opportunity to win a product selected by the end-user. The potential prizes offered for selection by the end-user may be chosen by an embodiment of the present disclosure, for example, from product items currently in the "Wish List" of the end-user, and that were placed in the "Wish List" because those product items piqued the interest of the end-user. Such product items may be eligible as prizes if they meet certain criteria such as, for example, whether the price of a product in the "Wish List" of the end-user falls within a prize price range of any of one or more sweepstakes promotions that are currently active on the on-line web site of the merchant sponsoring or operating the web site. The products from the "Wish List," a "Save For Later" collection/list, or a "Personal Catalog" of the end-user may be used to produce an assortment of products from which the consumer may choose potential prizes to be awarded upon winning a sweepstakes promotional game activity. In this way, an embodiment of the present disclosure may engage an end-user in a personalized game activity (in this example, a sweepstakes) in which the end-user is given a chance to win a product item prize from a group of products of specific interest to them, of interest to a member of their family, or of interest to a friend, rather than a prize item selected by the merchant operating or sponsoring the promotional game activity. At the same time, depending on the questions asked of the end-user when they select a product as a potential prize, the merchant operating or sponsoring the sweepstakes may, for example, poll the end-user to learn what types, categories, designers, or manufacturers of products are of interest to the end-user and why, and may discover aspects of the social graph of the end-user when, for example, the questions asked of the end-user focus on who the recipient of the prize will be or the reason(s) why the player has chosen a particular product.

Figure 2:
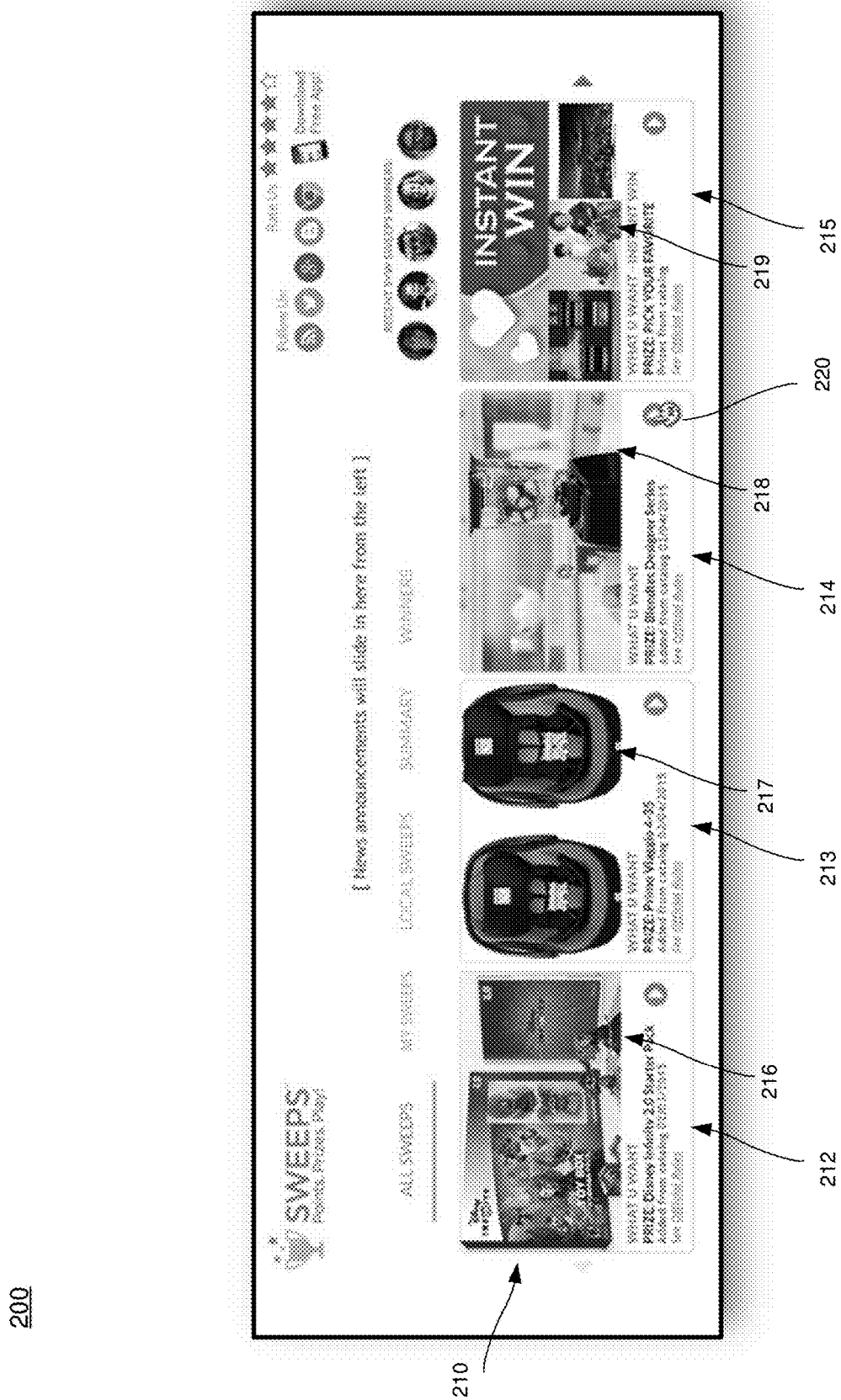
FIG. 2 is an illustration of an exemplary web page that includes a carousel showing a number of cells, where each cell contains information for a currently active sweepstakes game, in accordance with the present disclosure.

FIG. 2 is an illustration of an exemplary web page 200 that includes a carousel 210 showing a number of cells 212, 213, 214, 215, where each cell contains information for a currently active sweepstakes game, in accordance with the present disclosure. In some representative embodiments of the present invention, the web page of FIG. 2 may be displayed, for example, following login by an end-user to an on-line e-commerce web site of a merchant. In the illustration of FIG. 2, the information in cells 212, 213, 214, 215 for each sweepstakes game includes a respective illustration 216, 217, 218, 219 of a prize product that may be automatically selected by a system of the merchant from, for example, a "Wish List," a "Save For Later" collection/list, or a "Personal Catalog" of the end-user, according to criteria associated with each sweepstakes game. Although only four cells 212, 213, 214, 215 are shown in FIG. 2, a greater or lesser number of cells may be available, and may be viewed using left and right arrows to scroll the carousel of cells left and right. The criteria used in selecting products eligible for use as a prize may include, for example, a price range of the prize candidate product, a product category of the prize candidate product, whether a prize candidate product fits the theme of a currently active sweepstakes, a time or date order of a product being added to the "Wish List," "Save For Later" collection/list, or "Personal Catalog," or any other suitable criteria that may be chosen by the merchant sponsoring or operating the promotional activity. In some representative embodiments of the present disclosure, a product selected as a prize for a particular sweepstakes game may be the product that the end-user most recently placed in the "Wish List," "Save For Later" collection/list, or "Personal Catalog" that meets the criteria for a prize for the particular sweepstakes game.

Figure 3:
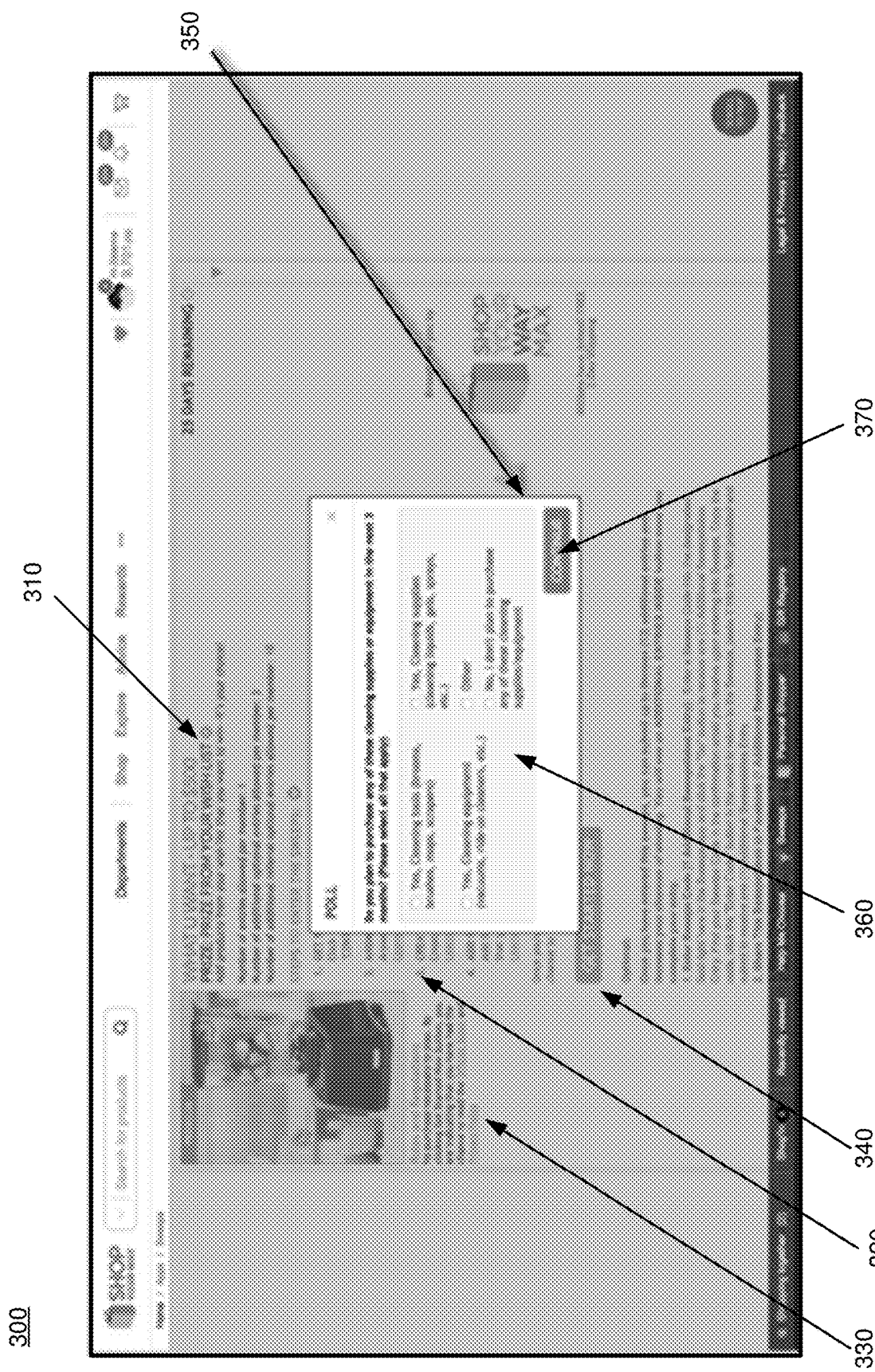
FIG. 3 is an illustration of an exemplary web page that may be displayed following end-user selection of a promotional activity featuring a desired prize such as, for example, the cell of FIG. 2, in accordance with a representative embodiment of the present disclosure.

A representative embodiment of the present disclosure may require a minimum number of products be chosen by the end-user as potential prizes. If a system in accordance with the present disclosure cannot identify a sufficient number of products that meet the criteria of currently active sweepstakes from the products in, for example, the "Wish List," the "Save For Later" collection/list, or one or more of the "Personal Catalogs" of the end-user, the consumer may be prompted to select additional product items that may fit within the criteria of any currently active sweepstakes, to enable the system to offer to the consumer a minimum of products that are eligible as sweepstakes prize choices. In a representative embodiment of the present invention, a system may display to the consumer product items from their "Wish List," "Save For Later" collection/list, or their "Personal Catalogs," and may highlight or accentuate those products that are eligible as prizes in currently active sweepstakes, using the criteria for each currently active sweepstakes. The consumer may then be asked to identify a certain number of the displayed products such as, for example, five products, for which they would like a chance to win. The consumer may identify the products of interest to them, by clicking on the cells 212, 213, 214, 215 that illustrate the products of interest. Upon choosing a sweepstakes showcasing a particular product of interest to the end-user, such as the cell 214 with an illustration of a blender product 218, the end-user may then be presented with additional details about their selection, as illustrated in FIG. 3. In a representative embodiment of the present disclosure, the end-user may pursue a chance to win the product illustrated in any of the cells 212, 213, 214, 215 by simply clicking on/selecting the "right arrow" icon, shown in cell 214 as right arrow icon 220.

FIG. 3 is an illustration of an exemplary web page 300 that may be displayed following end-user selection of a promotional activity featuring a desired prize such as, for example, the cell 214 of FIG. 2, in accordance with a representative embodiment of the present disclosure. The cell 214 of FIG. 2 selected by the end-user displays a product of interest to the end-user (i.e., that appears in their "Wish List," "Save For Later" collection/list, or a "Personal Catalog," and a sweepstakes for which the illustrated product is eligible sweepstakes prize according to the criteria for the sweepstakes. As shown in FIG. 3, the web page 300 may provide additional information related to the end-user selected cell 214 of FIG. 2, including a brief description 310 of the promotional game activity, a procedure for entry 320, rules and legal details 330 for the sweepstakes and prize, and a "Get Started Now" user interface element 340, which the user may click on/select to begin the process of participating in the promotional activity (i.e., in this example, entering the sweepstakes). As shown in FIG. 3, selection of the user interface element 340 may cause the display of a pop-up window 350 through which the operator or sponsor of the promotional activity may solicit a number of responses to questions to poll the end-user about personal interests and preference information about various aspects of the promotional activity such as, by way of example and not limitation, the reasons for selection by the end-user of the particular prize product that was chosen. Such information may be made part of a user profile maintained by the operator or sponsor of the promotional activity, for use in future marketing activities. The user may submit their responses to the poll questions presented in the pop-up window 350 and move on to completing the entry for the promotional activity, by clicking on/selecting the "Continue" user interface element 360.

Figure 4:
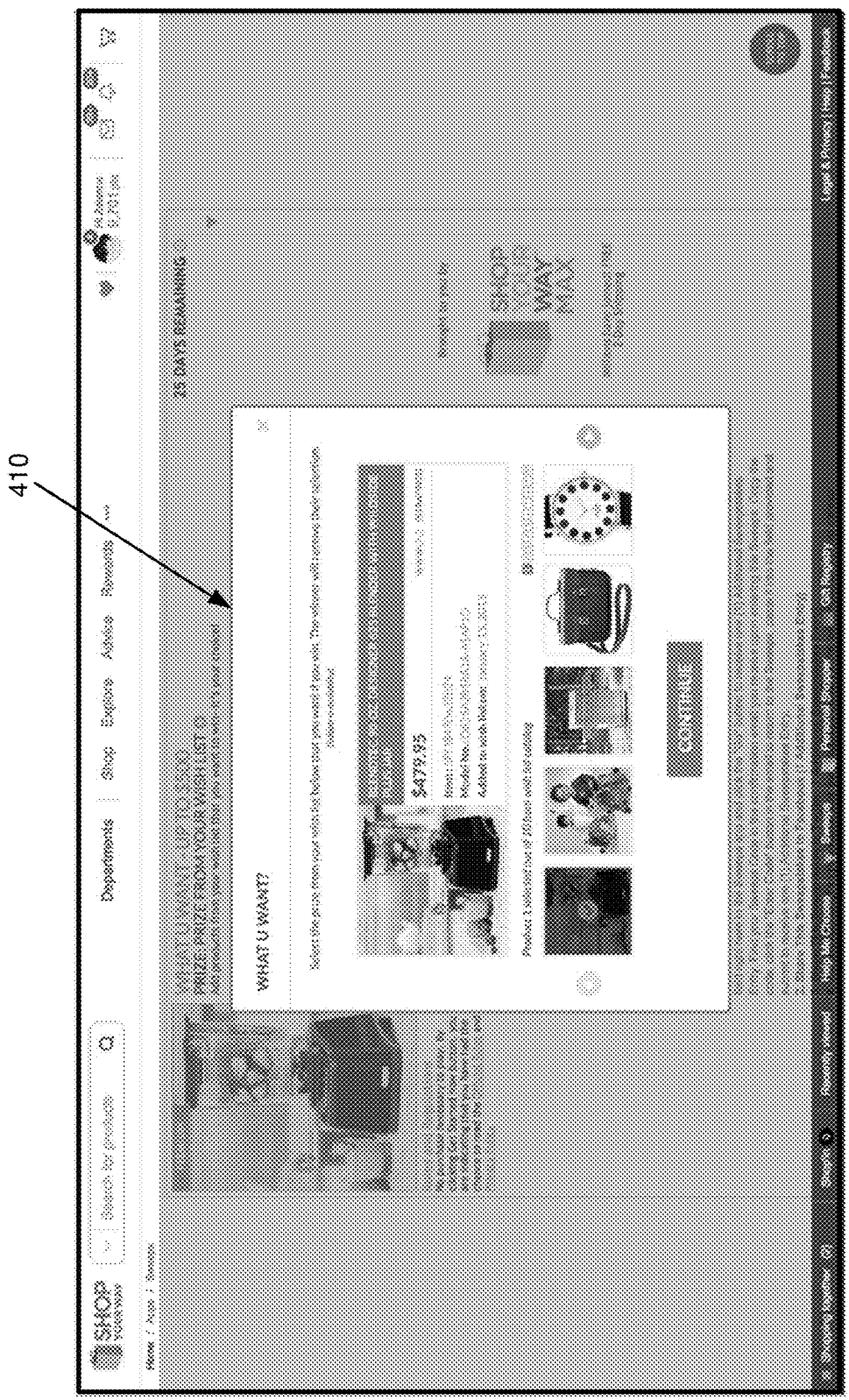
FIG. 4 is an illustration of an exemplary web page which may display to an end-user a pop-up window showing a number of product items from which the end-user may choose the prize that they may receive if they win the promotional activity, in accordance with a representative embodiment of the present disclosure.

FIG. 4 is an illustration of an exemplary web page 400 which may display to an end-user a pop-up window 410 showing a number of product items from which the end-user may choose the prize that they may receive if they win the promotional activity, in accordance with a representative embodiment of the present disclosure. The pop-up window 410 permits the end-user to select one or more product items as a potential prize to be awarded, in the case where the end-user wins the end-user selected promotional game activity (e.g., the chosen sweepstakes. In some representative embodiments of the present disclosure, the end-user may be asked to select as a potential prize, more than one of the available products displayed, to help ensure that an award of a prize is possible even when some of the products selected by the end-user as potential prizes are unavailable when a winner is selected, such as due to stocking or other issues.

Figure 5:
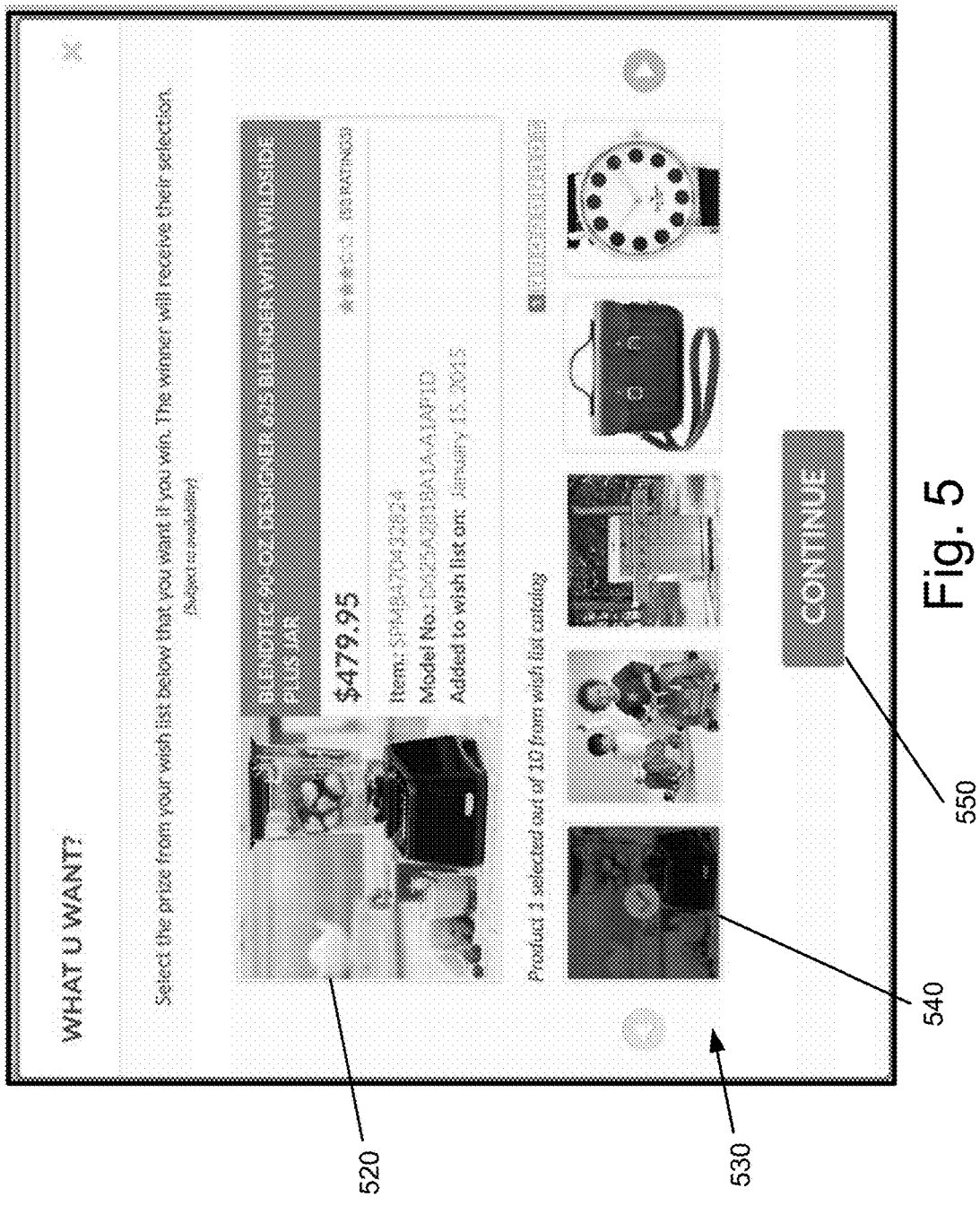
FIG. 5 is an illustration of an exemplary pop-up window that may correspond to, for example, an enlarged view of the pop-up window of FIG. 4, in accordance with a representative embodiment of the present disclosure.

FIG. 5 is an illustration of an exemplary pop-up window 510 that may correspond to, for example, an enlarged view of the pop-up window 410 of FIG. 4, in accordance with a representative embodiment of the present disclosure. The illustration of FIG. 5 shows what may be a randomly selected product taken from the "Wish List," "Save For Later" collection/list, or "Personal Catalog" of the end-user, and a carousel 530 that provides end-user access to a collection of images that may be automatically populated by a system in accordance with the present disclosure from the product items in the personal "Wish List," "Save For Later" collection/list, or "Personal Catalog of the end-user. In some representative embodiments of the present disclosure, the end-user may be requested to select one or more than one product item as a potential prize, and the system may randomly select a prize to be awarded to the end-user from the set of products selected by the end-user as potential prizes, if the end-user wins the promotional game activity. In the illustration of FIG. 5, the end-user has selected a first product item 540, which corresponds to the product image 520. However, by requesting the selection of additional products as potential prizes, a system in accordance with the present disclosure may gain more detailed insight into what products the end-user actually prefers or wants based on their choices from a larger set of prize options. The number of items to be selected may be determined by such a system based on what areas of the personal profile of the end-user are currently sparsely populated with information about the end-user.

A system according to the present disclosure may electronically access information about available inventory of the potential prizes chosen by the end-user in making the selection of the prize to be awarded, to ensure that the personalized prize to be awarded is available for delivery to the end-user. When the winner of the promotional activity is selected, they may be automatically notified of the prize selected for them via, for example, an automatically generated email, and the prize may be automatically be shipped and delivered to the winner based on personal information stored in the profile of the end-user that is maintained by the merchant operating or sponsoring the promotional game activity. Delivery of the prize to the winner of the promotional game activity may be contingent on the user responding to automated communication regarding completion of any documents needed to meet government tax submission requirements, based on information in the personal profile of the winning end-user.

Figure 6:
FIG. 6 is an illustration of another exemplary pop-up window that may correspond to, for example, the pop-up window of FIG. 5, in accordance with a representative embodiment of the present disclosure.

FIG. 6 is an illustration of another exemplary pop-up window 610 that may correspond to, for example, the pop-up window 510 of FIG. 5, in accordance with a representative embodiment of the present disclosure. In the illustration of FIG. 6, the end-user has selected product 4 of 10 in their "Wish List" catalog, as shown by the product images 620 and carousel selection 640. In some representative embodiment of the present disclosure, end-user may be enabled to filter the product items in his/her wish list for display to the end-user according to the type or category of product items the user would most like to select from as potential sweepstakes prizes such as, for example, items in the "Auto" or "Baby" categories. In the manner described above, a representative embodiment of the present disclosure may produce a custom sweepstakes game experience for every end-user. An embodiment of the present disclosure may employ user preference, interest, purchase history, and/or browsing history information from a user profile maintained by a merchant or sponsor of the sweepstakes, to customize the assortment of products shown to the user as possible prize choices, and the choices made by the end-user in selecting what they may win can be used to more accurately determine interest in particular product categories, brands, designer, styles, colors, and other differentiators, and in the process, reveal preferences and tastes of the end-user that may aid the merchant in future marketing efforts.

As previously discussed above, an end-user may browse information about various product items and may choose to save information about a particular product by using a "Want It" or "Save For Later" button, icon, or link, or a similar user interface element. Such a user interface element may, for example, appear on a product page of a web site of a merchant, or on a product or other screen of a mobile application installed on a mobile device by the end-user, and may permit the end-user to place information about a particular product item in persistent storage. Examples of persistent storage include, by way of example and not limitation, a "Wish List," a "Saved Items" list, a "For Purchase Later" list, or a "Personal Catalog," that enable the user to later review and choose to purchase a product item, either directly from the "Wish List," etc., or by moving the product item to a traditional shopping cart.

In one representative embodiment of the present disclosure, as described above, the end-user may request to participate in a promotional game activity such as, for example, a sweepstakes, where the prize awarded at the end date of the sweepstakes may be automatically selected from the "Wish List," "Save For Later" collection/list, or "Personal Catalog" of the end-user, resulting in the end-user playing a customized promotional game activity that, should the end-user be chosen as a winner, results in the end-user receiving a personalized prize of their own choice. As part of qualifying for entry for a chance to win a prize, the end-user may be asked to provide personal information that provides additional insights into the interests and preferences of the end-user to the operator or sponsor of the promotional game activity. Questions presented to the end-user may, for example, ask the end-user whether the product item is intended to be a purchase for the end-user, or as a gift for someone else. If intended for themselves, the end-user may be asked for personal information such as their age, gender, and marital status, and/or about their personal interests and product preferences such as, for example, their brand, designer, manufacturer, color, style, and price range preferences. If the end-user indicates that the product item is intended for another person, the end-user may be asked for details about the intended recipient including such as those above, or for information that provides details, for example, about whether the intended recipient is a friend or a family member, is a member of the household of the end-user, the reason for the purchase, and/or any other questions that may provide greater insight about the various dimensions of the personal life of the end-user that may aid in marketing activities of the operator or sponsor of the promotional game activity. Following completion of the questions, the end-user may then be entered in the promotional game activity (e.g., a sweepstakes) for which they are eligible and which they elect. The end-user then waits until the end date of the promotional game activity, to hear whether they have been chosen as a winner. If they have won, they may then receive their selected product as the prize.

In another representative embodiment of the present disclosure, an end-user in the act of adding a particular product item to persistent storage such as, by way of example and not limitation, to a "Wish List," a "Save For Later" collection/list, or a "Personal Catalog," may be offered the chance for an "Instant Win" of the particular product item of interest to them. The offer to participate may appear, by way of example and not limitation, as a pop-up window notifying the end-user of the opportunity to play an "Instant Win" game for a chance to win the particular product item of interest to the end-user. The term "Instant Win" may be used herein to refer to a game in which a player may be qualified for an immediate chance to win a prize, during a certain period of time of operation of the "Instant Win" game. Thus, in contrast to the sweepstakes described above, in which the participant enters and then waits until the end of the promotional activity to learn whether they have won, in an "Instant Win" according to the present disclosure, the prize is awarded to a winner immediately. The prize awarded to a given end-user may be one prize instance of a designated number of prize instances, where each prize instance has a prize value within a particular range (e.g., between $50 and $100, or between $250 and $300), and qualification for a chance to win may be based on rules governing the award of a prize. The prize awarded to the end-user in the event of a win may be, for example, the actual product item of interest about which product information was being "saved," or may be an amount of "reward points" or "loyalty points" of the merchant operating or sponsoring the "Instant Win" game, to enable the end-user to purchase the product item of interest.

In a representative embodiment of the present disclosure, a promotion management system may be employed to assist in the creation and deployment of each "Instant Win" game. An example of one such promotion management platform which may be used to support "Instant Win" games as described herein may be found in U.S. patent application Ser. No. 14/321,450, entitled "Methods and Systems for an E-Commerce Promotions Platform," filed Jul. 1, 2014, the complete subject matter of which is hereby incorporated by reference herein, in its entirety. A like system may be used to create instances of large numbers of concurrent "Instant Win" games. Creation of each "Instant Win" game instance may involve, by way of example and not limitation, the specification of the maximum number of prize instances to be awarded in each "Instance Win" game; the specification of criteria such as the permissible product categories of the prizes to be awarded, and the price range of each prize instance eligible to be awarded for each "Instant Win" game; and the specification of the start date and end date of each "Instant Win" game, and whether a physical product or a certain amount of "reward points" or "loyalty points" are to be awarded to the winner. The system may also, for example, permit the operator or sponsor of each "Instant Win" game to create or identify any media content (e.g., text, graphic, video, and/or audio content) to be presented to end-users via the web pages, screens, or mobile applications via which the end-user participates including, for example, media content that explains the rules, terms, and conditions for participation to the end-user via whatever communication medium (e.g., Internet, mobile application, cellular short message service (SMS) or multimedia messaging service (MMS)) is used. Such rules, terms, and conditions for participation may be automatically selected, displayed, and enforced by the system of the present disclosure in accordance with the location (e.g., State of Residence, or current physical location) of the end-user at the time of participation.

In some representative embodiments of the present disclosure, a web page for a product item may include a specific user interface element such as, for example, a button, an icon, or a badge that permits the end-user to have a chance to win the particular product displayed on the current product web page, in an "Instant Win" promotional game activity, such as that described above. In some representative embodiments of the present disclosure, a button, icon, or badge may be added to a web page or mobile application screen selected by an end-user, such as on a blog or personal web page.

As described above, each "Instant Win" game accessible via such a user interface element may have certain criteria that must be met for entry. For example, the criteria for a particular "Instant Win" may include that the value of the product item selected by the user (i.e., price) must be within a range of prices of a currently active "instant win, or that the category of the product item must be one of those specified for the "Instant Win" game. In accordance with the present disclosure, as above, the end-user may qualify for a chance at an "Instant Win" by responding to one or more questions presented to the end-user upon selection of the user interface element (e.g., button, icon, or badge) for the "Instant Win" game. As described above, the end-user may be asked whether the product item is intended to be a purchase for the end-user or as a gift for someone else, and for personal information such as their own and/or the recipient's age, gender, and marital status, and/or personal interests, product preferences, and their brand, designer, manufacturer, color, style, and price range preferences. The end-user may be asked for information that provides details about their relationship to the intended recipient, the reason for the purchase, and/or any other questions that may provide to the or operator or sponsor of the system, greater insight about the various dimensions of the personal life of the end-user that may aid in marketing activities of the operator or sponsor of the "Instant Win" game.

In a representative embodiment of the present disclosure, each end-user may be allowed only a certain number of "Instant Win" chances over a particular period of time (e.g., one per hour, three per day, five per week, per month, per year), to help create a sense of urgency and need to carefully consider a product choice. This results in the careful consideration of use of each "Instant Win" chance by the end-user, which in turn lends greater validity to the degree of interest or desirability to the end-user of their choice of product items for which an "Instant Win" chance is used. Before allowing the user a chance with regard to a specific "Instant Win" game, a system according to the present disclosure may determine whether the end-user has any remaining "Instant Win" chances. If the end-user has no remaining "Instant Win" chances, the end-user may be offered the opportunity to attempt to win the product item of interest, by entering one of the currently active sweepstakes promotional games activities, described above. The system may automatically determine, based on the product of interest to the end-user and the criteria of each active sweepstakes games, the currently active sweepstakes games whose criteria permit the award of the product of interest to the end-user as a prize. For example, while there may currently be twenty-five active sweepstakes promotional game activities in a particular system according to the present disclosure, the criteria of only two active sweepstakes games may permit an end-user to play to win a product prize in the "power tool" category and having a price in a range of between $150 and $200. The end-user may be informed that the product of interest to the end-user is not eligible as a prize for any currently active sweepstakes, or the system may show to the end-user only those active sweepstakes games for which the product of interest fits within one of the allowable product categories and within the range of prize prices for the sweepstakes criteria. It should be noted that although the above example illustrates qualification of an end-user selected product based criteria that define eligible product categories and a range of product prices, other criteria may be used to determine whether a user-selected prize (e.g, a particular product) is eligible for an "Instant Win" game, or a sweepstakes promotional game, in accordance with the present disclosure.

In a representative embodiment of the present disclosure, once the end-user has answered the questions of the poll qualifying the end-user for a chance for an "Instant Win," the system may then determine whether the end-user is eligible for a chance to win any of the "Instant Win" games that are currently active and for which the criteria (discussed above) are met. If the product item selected by the end-user meets the criteria of two or more active "Instant Win" games, a system in accordance with the present disclosure may offer the user a way to select for which "Instant Win" the end-user would like a chance to win, provided that the end-user. In some representative embodiments, the order of polling the end-user and determining eligibility may be different.

FIGS. 7A-7D are a flowchart illustrating an exemplary method for assessing consumer preferences and interests by engaging an end-user in a game in which the end-user may be given a chance to win a product item chosen by the end-user, in accordance with a representative embodiment of the present disclosure. The following discussion of the various actions described in FIGS. 7A-7D may be performed by various elements of the system described above with respect to FIG. 1. For example, in some representative embodiments of the present disclosure, the actions of the various portions of FIGS. 7A-7D may be performed by a system such as the computer system 80 communicating via a network with a browser application running on a user device such as, for example, any of processing devices 20, 20', 20" of FIG. 1. In another representative embodiment of the present disclosure, portions of the actions described with respect to FIGS. 7A-7D may be performed by what may be referred to herein as an application, "app," or "mobile app" installed on a user device (e.g., one of processing devices 20, 20', 20" of FIG. 1) by the user, while other portions of the actions of FIGS. 7A-7D may be performed by one or more processors of other element of a system such as that shown in FIG. 1. It should be noted that the order of the various steps of the example method of FIGS. 7A-7D may be rearranged, that steps may be combined or that steps may be eliminated, and that additional steps for actions described herein but not shown in FIGS. 7A-7D may be added, without departing from the spirit and scope of the present disclosure. It should also be noted that although the following discussion of the example method of FIGS. 7A-7D makes reference to an "Instant Win" game, the actions of FIGS. 7A-7D may also apply to other promotional game activities as well, without departing from the scope and spirit of the present disclosure.

Figure 7A:
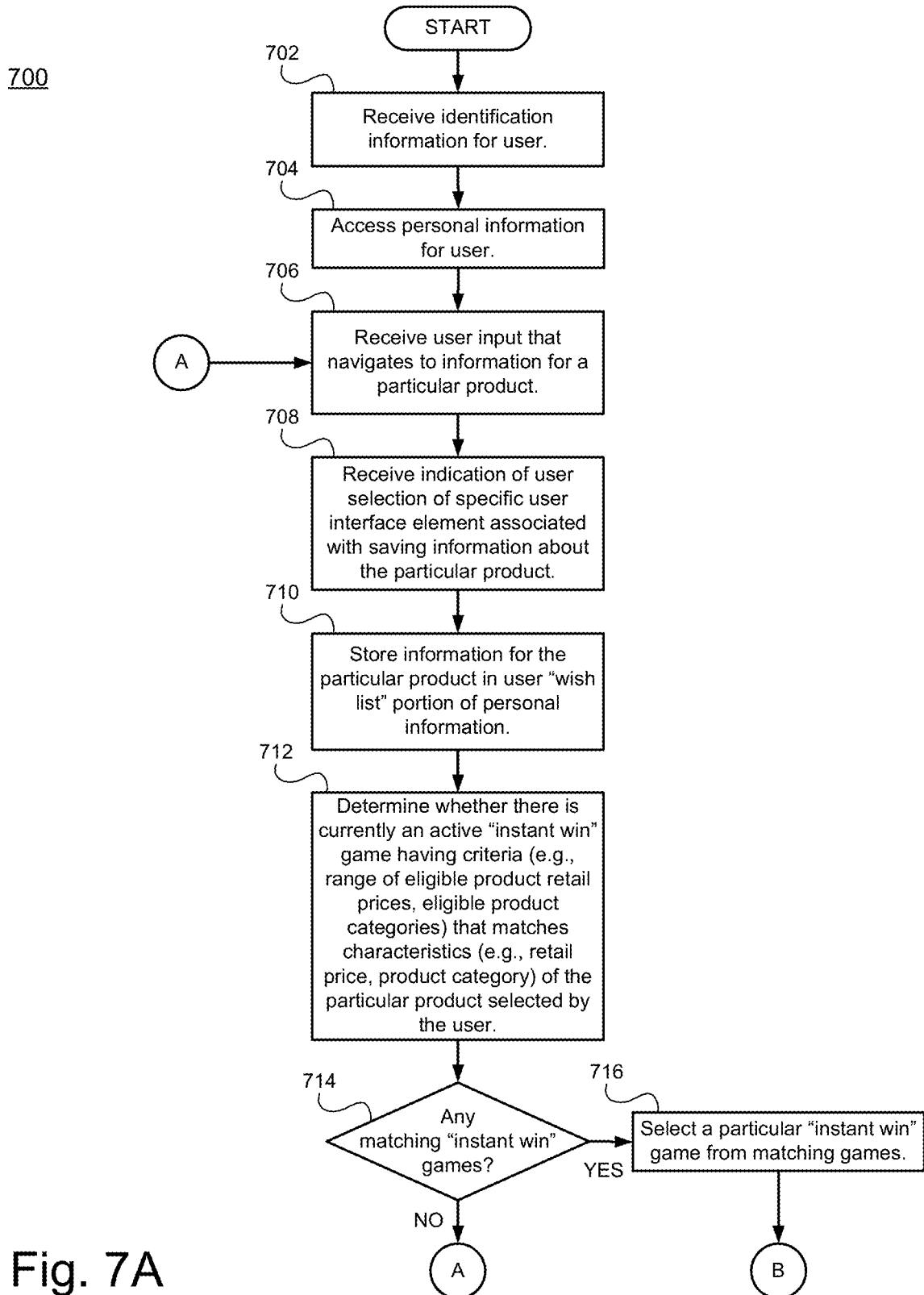
FIGS. 7A-7D are a flowchart illustrating an exemplary method for assessing consumer preferences and interests by engaging an end-user in a game in which the end-user may be given a chance to win a product item chosen by the end-user, in accordance with a representative embodiment of the present disclosure.
Figure 7B:
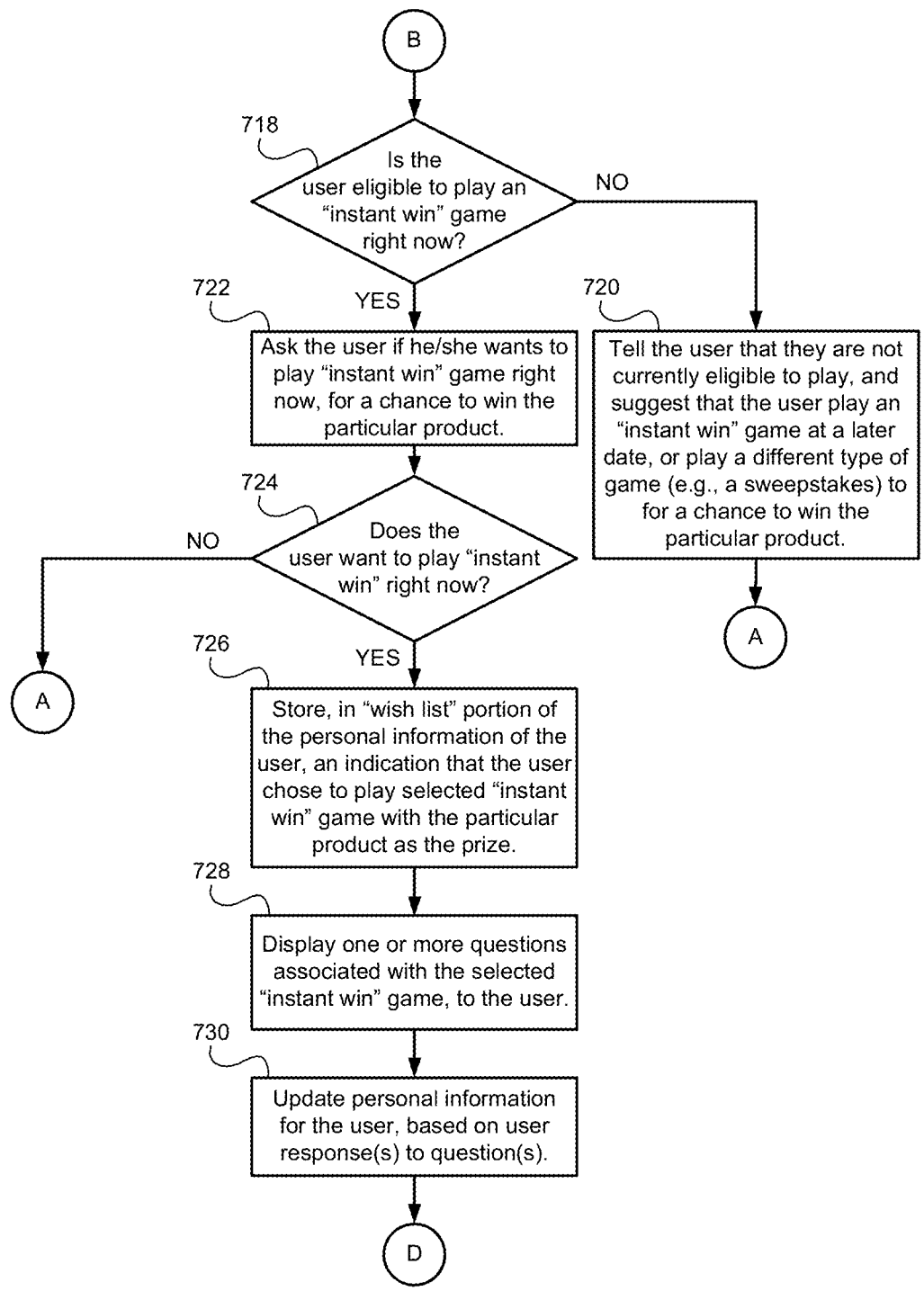
Figure 7C:
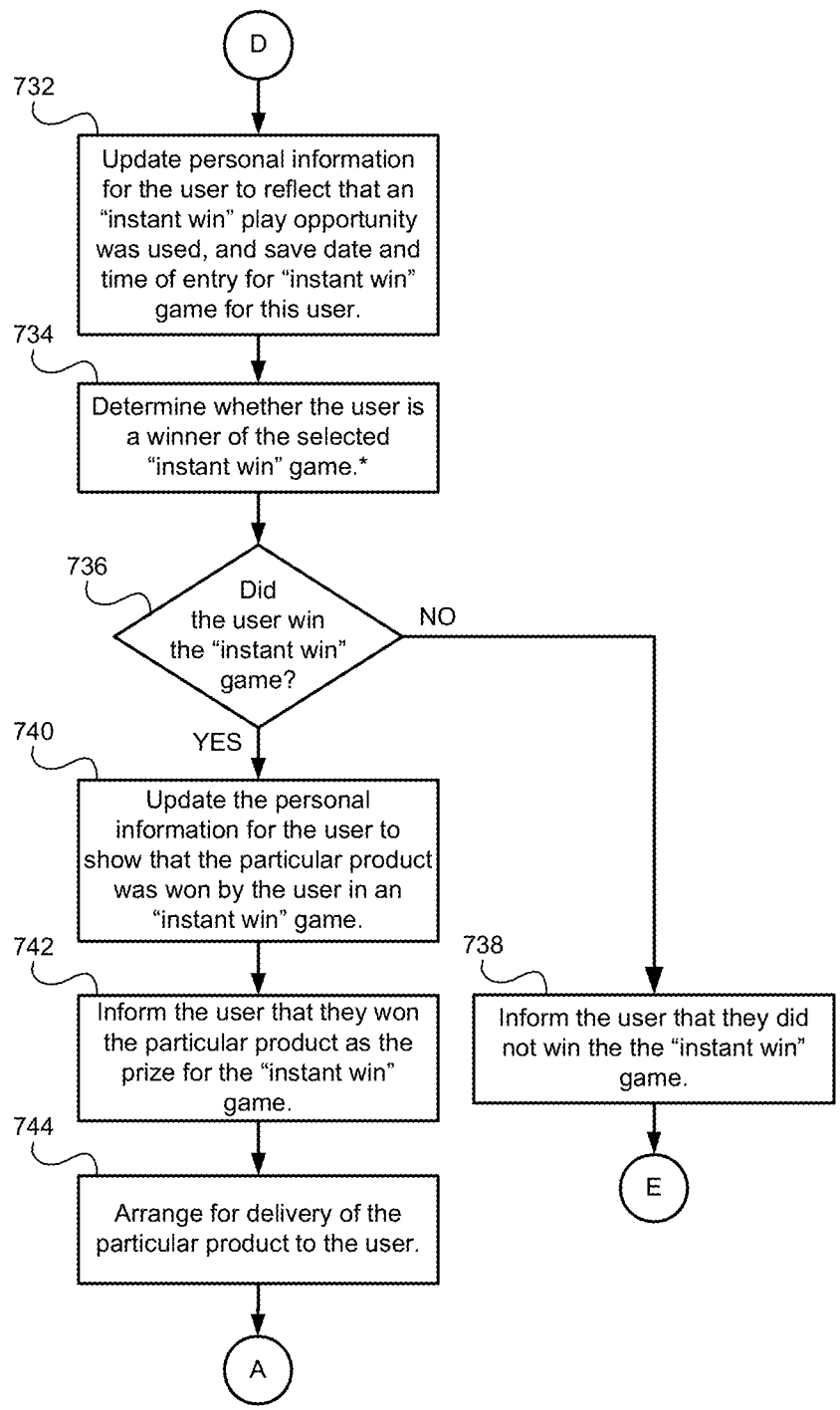

The method of FIGS. 7A-7D begins at block 702 of FIG. 7A, where a system such as the computer system 80 of FIG. 1 receives identification information for an end-user via a browser or other software application of a user device such as one of the processing devices 20, 20', 20" of FIG. 1. The identification information for the end-user may be provided by the end-user when activating a mobile application on a user device or logging in to a web site via a web browser running on a personal computer. Next, at block 704, the system performing the method may access personal information about the end-user that is maintained on, for example, a data repository such as storage 80A attached to computer system 80 of FIG. 1. Such personal information may include, by way of example and not limitation, the end-user home or business address; gender; age; marital status; life stage; personal interests and hobbies; product preferences such as product brands, styles, designers, colors, and sizes; on-line and in-store browsing behavior and history, on-line and in-store shopping or purchasing history; credit card information; information about other individuals known to the end-user such as friends and family; and many more items.

Next, at block 706, the system may receive end-user input that navigates the user through the web pages of the web site or screen of the mobile application to information for a particular product item of interest to the end-user. The system may then receive information indicating end-user selection of a specific user interface element, such as, for example, a "Want It" or "Save For Later" button or icon that is represents an end-user request to save information about the particular product in a persistent storage location such as, for example, a "Wish List," a "Save For Later" collection or list," or a "Personal Catalog." In response to the end-user selection of the "Want It" or "Save For Later" button or icon, the system performing the method of FIGS. 7A-7D may then store information for the particular product item of interest to the end-user in, for example, a "Wish List" portion of the personal information maintained in, for example, the data storage 80A of the computer system 80 of FIG. 1.

Next, at block 712, a determination may be made whether there is currently an active "instant win" game having criteria (e.g., range of eligible product prices, categories, manufacturers, brands, styles, colors, etc., as described elsewhere herein) that matches characteristics (e.g., retail price, product category) of the particular product selected by the end-user. A large variety of criteria may be used to determine whether a particular product item of interest to the end-user is eligible to be awarded to the end-user as a prize for a promotional activity such as, for example, an "Instant Win" game including, by way of example, the manufacturer, brand, model, style, price, and product category (e.g., "Appliances," "Tools," "Men's Clothing," "Electronics," "Automotive," etc.) of the product item of interest. Then, at block 714, the method returns to block 706, if there is no currently active "Instant Win" game for which the product of interest to the end-user is eligible as a prize, or continues at block 716, if there is a currently "Instant Win" game for which the product of interest to the end-user is eligible as a prize. At block 716, the method of FIGS. 7A-7D then selects for the end-user, an "Instant Win" game from those for which the particular product item is eligible as a prize. In some representative embodiments of the present disclosure, if there are multiple "Instant Win" games whose criteria would allow the product item to be used as the prize, the system performing the method of FIGS. 7A-7D may choose that Instant Win game having the fewest criteria or lowest barrier to entry. The method then continues at block 718.

At block 718, a determination is made as to whether the end-user has any chances available to play an "Instant Win" game. As described above, each end-user may be allowed a certain number of chances to win an "Instant Win" game for a prize of their own choosing within a certain period of time (e.g., 'X' chances per hour, per day, per week, per month, etc.). If it is determined that the end-user is not eligible to play an "Instant Win" game at this time because they have no chances left, the method continues at block 720. At block 720, the system performing the method of FIGS. 7A-7D may tell the end-user that they are not currently eligible to play, and may suggest that the end-user play an "instant win" game at a later time or date, or play a different type of game (e.g., a sweepstakes) for a chance to win the particular product of interest. If, however, it is determined that the end-user is currently eligible to play an "Instant Win" game, the method proceeds to block 722, where the end-user may be asked if they wish to play an "Instant Win" game, right now, for a chance to win the particular product of interest to them.

Next, at block 724, the method determines whether the end-user wishes to play an "Instant Win" game for a chance to win the particular product of interest. If the end-user indicates that they do not wish to play, for whatever reason (e.g., they choose not to use one of their remaining chances for a chance to win the particular product of interest), the method may return to block 706, described above. If, however, the end-user does wish to play an "Instant Win" game for a chance to win the particular product of interest, the method continues at block 726, where the system may store, in a "Wish List" or other designated portion of the personal information of the end-user, an indication that the end-user chose to play the selected "Instant Win" game with the particular product item of interest as the prize. The method then, at block 728, may display one or more questions associated with the selected Instant Win game, to the end-user, and collect the response(s) of the end-user to those questions. The personal information maintained by the operator or sponsor of the "Instant Win" game for the end-user (previously discussed above) may then, at block 730, be updated to reflect the end-user response(s) to the question(s) posed to the end-user. The method then continues at block 732 of FIG. 7C.

Figure 9:
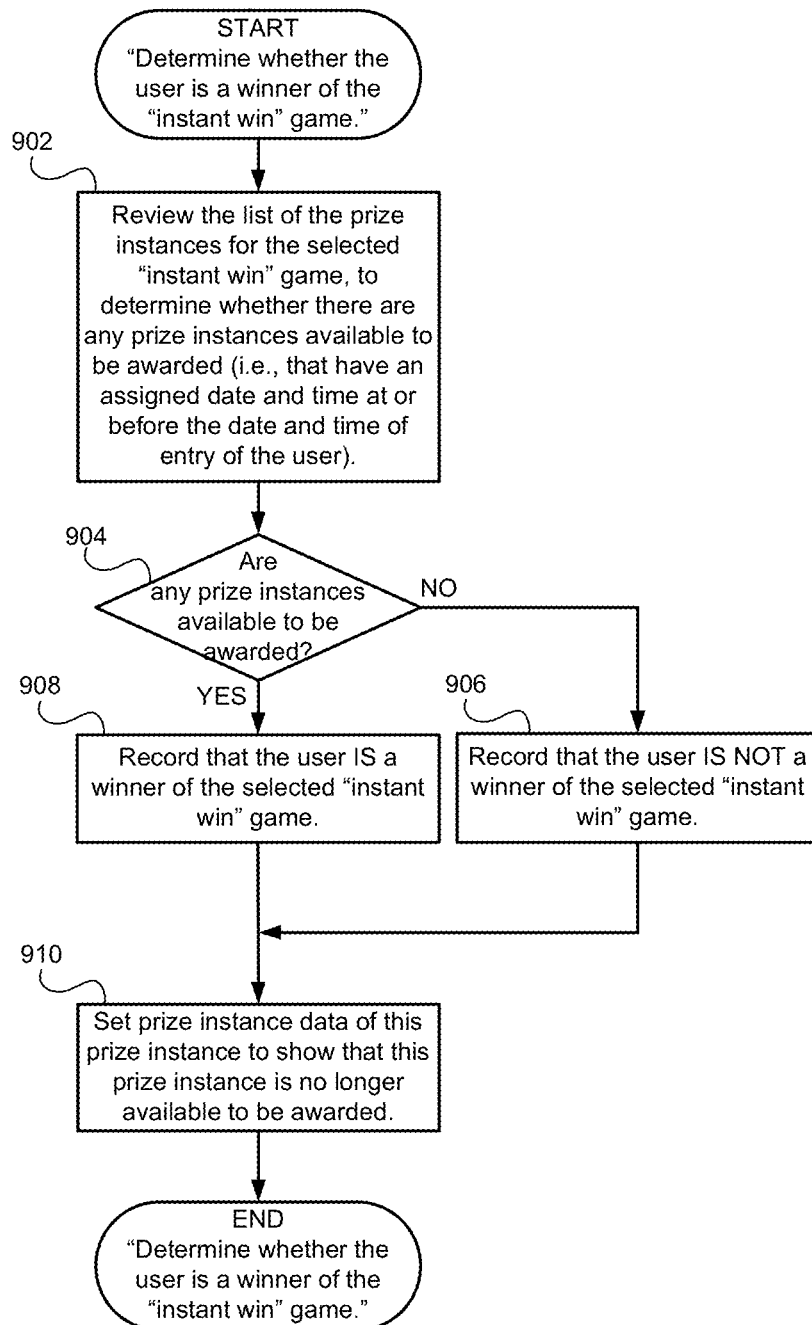
FIG. 9 is a flowchart illustrating an exemplary method for determining whether an end-user is a winner for a particular instance of an "Instant Win" game, in accordance with a representative embodiment of the present disclosure.

At block 732, the method may update the personal information for the end-user to reflect that an "instant win" play opportunity was used, and save the date and time of entry for the "instant win" game in the personal information for the end-user. Then, at block 734, the method may direct the system to determine whether the end-user is a winner of the selected "Instant Win" game. FIG. 9, discussed below, describes the actions involved in making such a determination. Once a determination of whether the end-user is a winner, the method of FIGS. 7A-7D then, at block 736, passes control to block 738, if the end-user is not a winner of the selected "Instant Win" game, or to block 740, if the end-user is a winner. At block 738, the system performing the method of FIGS. 7A-7D may inform the end-user that they did not win the selected "Instant Win" game, and continue at block 746 of FIG. 7D. At block 740, however, the method may update the personal information for the end-user to show that the particular product item was won by the end-user in the selected "instant win" game. Then, a block 742, the system may inform the end-user that they won the particular product item as the prize in the "Instant Win" game just played, and at block 744, the system may make arrangements for delivery of the particular product to the end-user. It should be noted that making arrangements for delivery of the prize product item may include collecting from the end-user, information needed for reporting to government entities the value of the prize, and collecting delivery location information, if not already contained in the personal information of the end-user maintained by the sponsor or operator of the "Instant Win" game. The method may then pass control to block 706, described above.

Figure 7D:
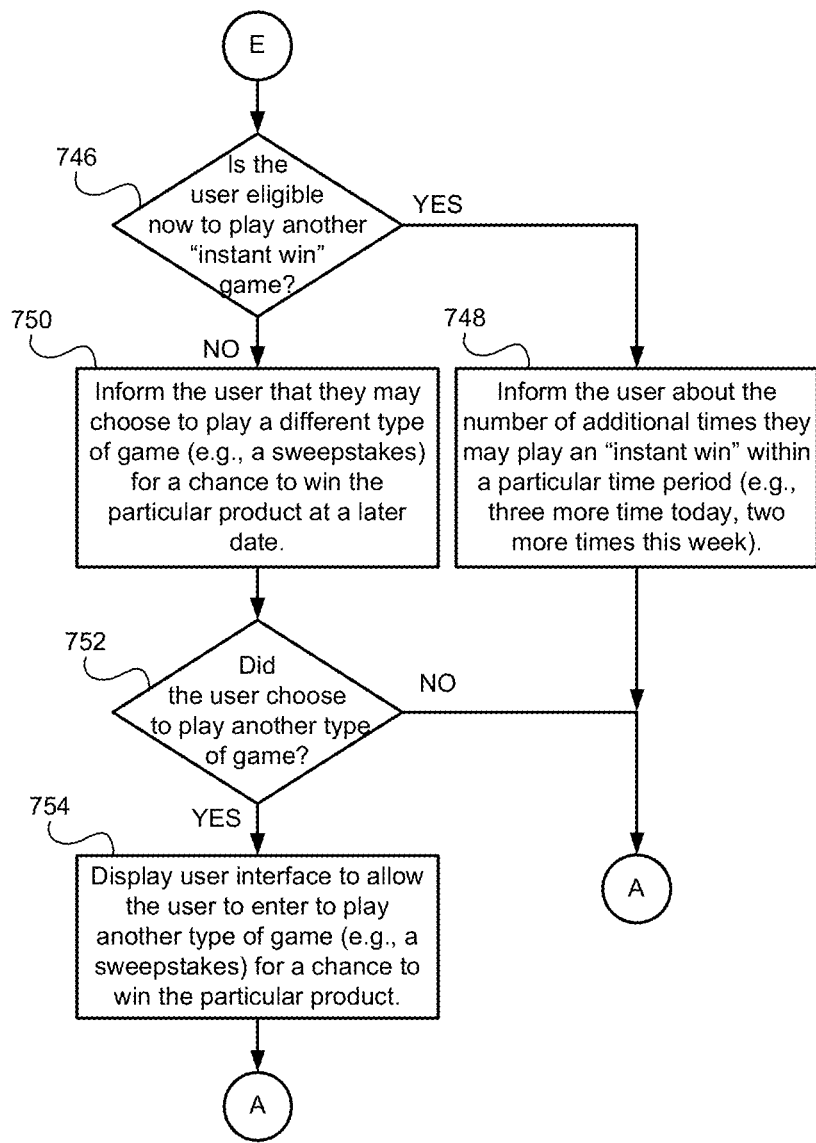

At block 746 of FIG. 7D, the method of FIGS. 7A-7D may determine whether the end-user is eligible to play another "Instant Win" game (i.e., whether the end-user has any remaining chances to win an "Instant Win" game for a prize of their own choosing within a certain period of time (e.g., 'X' chances per hour, per day, per week, per month, etc.)) If the method determines, at block 746, that the end-user does have at least one chance remaining to win via a "Instant Win" game, then at block 748, the system may inform the end-user of the number of additional times they may play an "Instant Win" within the certain time period (e.g., three more time today, two more times this week), and continue at block 706, described above. If, however, at block 746, the method determines that the end-user has no remaining chances to play an "Instant Win" game at this time, the system performing the method may, at block 750, inform the end-user that they may choose to play a different type of promotional game activity (e.g., a sweepstakes) for a chance to win the particular product of interest at a later date. Then, at block 752, the method may determine that the end-user has not chosen to play another type of promotional game activity (e.g., a sweepstakes), and the method may return to block 706, described above. However, if at block 752 the method determines that the end-user has chosen to try to win the particular product item via another type of promotional game activity, the system performing the method of FIGS. 7A-7D may display an appropriate user interface to allow the end-user to enter to play an alternate (i.e., non-"instant Win") game for a chance to win the particular product item. The method may then continue at block 706, described above.

Figure 8:
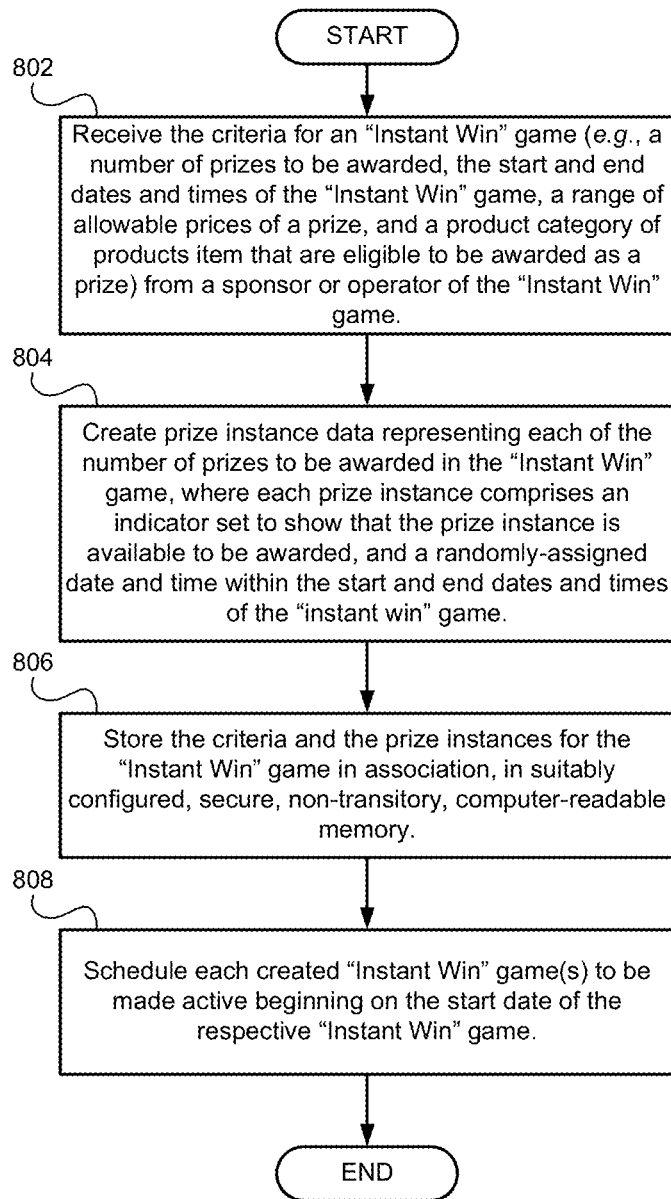
FIG. 8 is a flowchart illustrating an exemplary method for creating prize instance data for use in operating an "Instant Win" game in which an end-user may be given a chance to win a product item chosen by the end-user, in accordance with a representative embodiment of the present disclosure.

FIG. 8 is a flowchart illustrating an exemplary method for creating prize instance data for use in operating an "Instant Win" game in which an end-user may be given a chance to win a product item chosen by the end-user, in accordance with a representative embodiment of the present disclosure. The following discussion of the various actions described in FIG. 8 may be performed by various elements of the system described above with respect to FIG. 1. For example, in some representative embodiments of the present disclosure, the actions of the FIG. 8 may be performed by a system such as the computer system 80 using data stored in the data storage 80A. It should be noted that the order of the various steps of the example method of FIG. 8 may be rearranged, that steps may be combined or that steps may be eliminated, and that additional steps for actions described herein but not shown in FIG. 8 may be added, without departing from the spirit and scope of the present disclosure. It should also be noted that although the following discussion of the example method of FIG. 8 makes reference to an "Instant Win" game, the actions may also apply to other promotional game activities as well, without departing from the scope and spirit of the present disclosure.

The method of FIG. 8 begins at block 802, where the system performing the method may receive the criteria for an "Instant Win" game from a sponsor or operator of the "Instant Win" game. The criteria may include, by way of example and not limitation, a number of prizes to be awarded, the start and end dates and times of the "Instant Win" game to be created, a range of prices of the product items eligible to be awarded as a prize, and a product category of products item that are eligible to be awarded as a prize. Additional suitable criteria are mentioned elsewhere in this application. A system that may be suitable for supporting the creation and management of large numbers of concurrent promotional activities such as an "Instant Win" may be found in U.S. patent application Ser. No. 14/321,450, entitled "Methods and Systems for an E-Commerce Promotions Platform," filed Jul. 1, 2014, the complete subject matter of which is hereby incorporated by reference herein, in its entirety.

Next, at block 804, a system in accordance with the present disclosure may create, for each "Instant Win" game to be made available, prize instance data representing each of the number of prizes to be awarded in the particular "Instant Win" game. Each prize instance may include an indicator set to show that the prize instance is available to be awarded, and a randomly-assigned date and time within the time period defined by the start and end dates and times of the particular "Instant Win" game. All of the prize instance data for all "Instant Win" games that are active or are scheduled for a future start date may form a collection or list of prize instance data that for storage in secure memory.

Then, at block 806, the system may associate the criteria and the prize instances for the "Instant Win" game by storing those data elements in association, in suitably configured, secure, non-transitory, computer-readable memory. For example, the computer system 80 and data storage 80A may be configured with suitably secure non-transitory memory that is not accessible to other systems, to securely store information used to determine winners of the active "Instant Win" games running on the computer system 80. This is to ensure that details of prize instances are not accessible to those that may make use of those details to their advantage in winning prizes from active promotional game activities. Hardware and software techniques for implementing such secure storage are known, and details of such techniques are available outside of the present disclosure.

Finally, at block 808, the system may schedule each created "Instant Win" game(s) to be made active beginning on the start date of the respective "Instant Win" game.

FIG. 9 is a flowchart illustrating an exemplary method for determining whether an end-user is a winner for a particular instance of an "Instant Win" game, in accordance with a representative embodiment of the present disclosure. The following discussion of the various actions described in FIG. 9 may be performed by various elements of the system described above with respect to FIG. 1. For example, in some representative embodiments of the present disclosure, the actions of the FIG. 9 may be performed by a system such as the computer system 80 using data stored in the data storage 80A. It should be noted that the order of the various steps of the example method of FIG. 9 may be rearranged, that steps may be combined or that steps may be eliminated, and that additional steps for actions described herein but not shown in FIG. 9 may be added, without departing from the spirit and scope of the present disclosure. It should also be noted that although the following discussion of the example method of FIG. 9 makes reference to an "Instant Win" game, the actions may also apply to other promotional game activities as well, without departing from the scope and spirit of the present disclosure.

The method of FIG. 9 begins at block 902, where the system performing the method of FIG. 9 may determine whether there are any prize instances currently available to be awarded (e.g., that have an assigned date and time at or before the date and time of entry of the user) for the "Instant Win" game for which the end-user has asked for a chance to win their particular product item of interest. In a representative embodiment of the present disclosure, a prize instance may be available to be awarded at a particular date and time when an end-user choose to play an "Instant Win" game, if the prize instance has not yet been awarded, and if the date and time associated with the prize instance is the same as or earlier than the date and time at which the end-user is qualified to play the "Instant Win" game. Depending on the number prizes to be awarded for a particular "Instant Win" game, and the period of time over which the prizes are to be awarded for that particular "Instant Win" game, there may be zero, one, or more than one prize instance available to be awarded at any point in time. Further, not all prize instances may be awarded, depending on how the prize instances are randomly distributed over the time period over which the "Instant Win" game is active, and the dates and times at which end-users are qualified for a chance to win the product item of interest.

Next, at block 904, the system passes control to block 906, where the system record that the end-user is not a winner of a prize in the selected "Instant Win" game, or the system passes control to block 908, where the system records that the end-user is a winner in the selected "Instant Win" game. In either case, the system performing the method of FIG. 9 then continues at block 736 of FIG. 7C.

Figure 10:
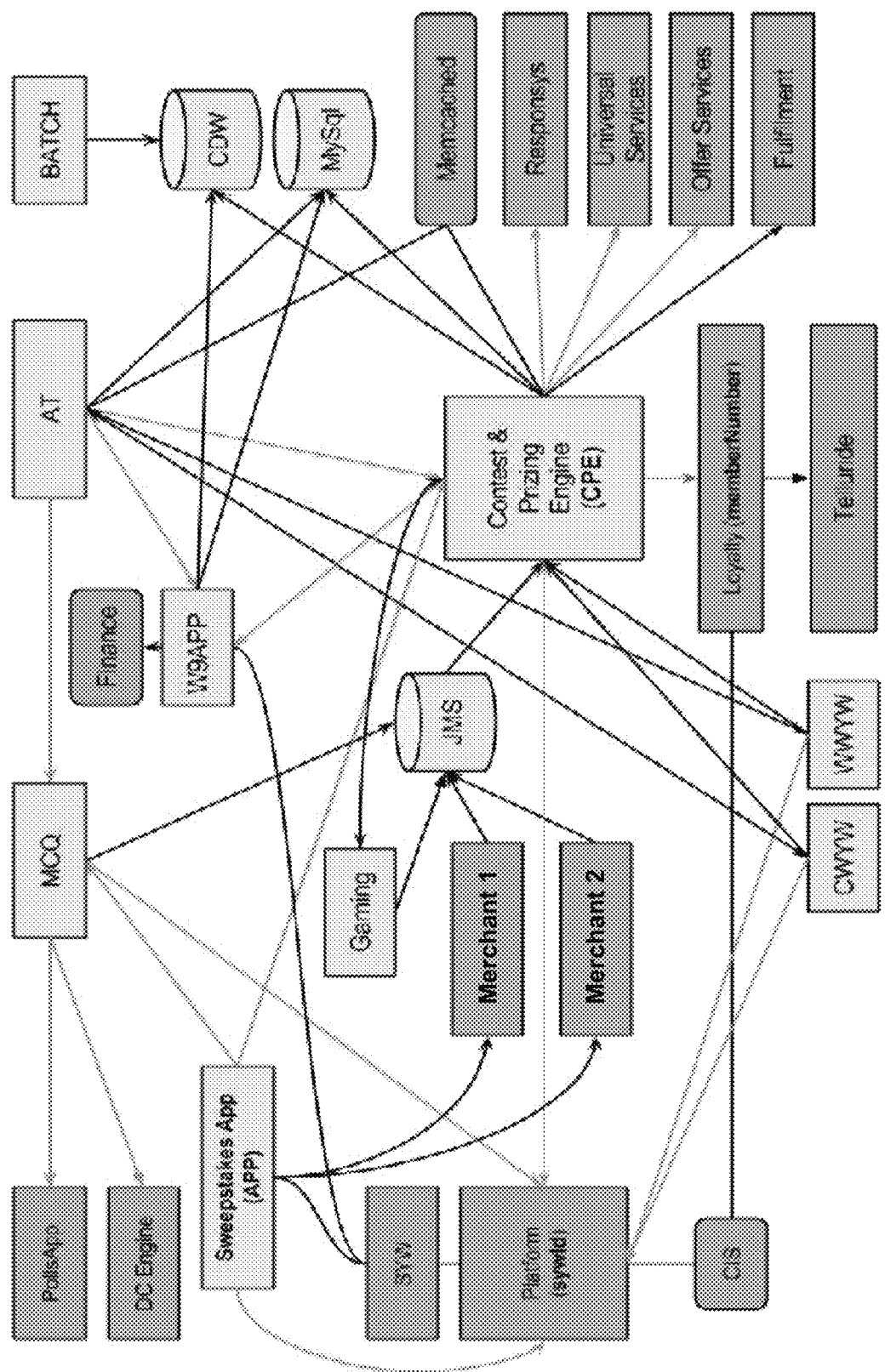
FIG. 10 is an illustration of example functional blocks of a system architecture that is in accordance with the present disclosure.

FIG. 10 is an illustration of example functional blocks of a system architecture that is in accordance with the present disclosure. The functionality of FIG. 10 is used to support the various aspects of the method and system described above. It should be noted that the particular segmentation or division of system functionality into the functional blocks illustrated in FIG. 10 are for illustration purposes only, and that other functional organization may be employed in realizing an embodiment of the present disclosure.

The illustration of FIG. 10 includes a SYW functional block that acts as a wrapping host for the user interface (UI) applications. The end-user interactions originating on the user interface of the system of the present disclosure may be provided by the SYW functional block. FIG. 10 also includes a Platform functional block that may contain and support the application program interfaces (APIs) that provide the data used for most of the end-user events (users information, tags, products) as well as send the user events forward to a Core Prizing Engine (CPE) functional block, described further below. The functional architecture of FIG. 10 also shows a Telluride functional block, and a Loyalty functional block, which provide an extended personal profile for the end-user, as well as manage and keep historical records of any transactions involving "reward points" or "loyalty points" of a merchant. FIG. 10 also shows a PollsApp functional block that provides questions and stores end-user responses for the polling of end-users regarding their personal interests and an end-user profile.

The illustration also includes a DCEngine functional block which comprises a question provider engine in which every further question depends on the previous end-user choices. The answers/responses from the end-user directly affect the information in the end-user's profile. FIG. 10 also illustrates a Responsys functional block that may be responsible for handling all of the mailings that go to end-users that are playing promotional game activities such as sweepstakes and "Instant Wins," and a Fulfillment functional block that receives a list with the primary selection of winners, and which is responsible for sending certain classes of prizes to winners, and to confirm winners to whom prizes have been awarded. FIG. 10 also illustrates a CDW functional block that serves as a data warehouse that stores crossed information for all the applications that are a part of a representative embodiment of the present disclosure.

FIG. 10 also shows an AT Application functional block that acts as an internal user interface that supports creation of promotional game activities by, and provides statistical data to the operators and sponsors of the system of the present disclosure. An example of such an AT Application may be found, for example, in U.S. patent application Ser. No. 14/321,450, entitled "Methods and Systems for an E-Commerce Promotions Platform," filed Jul. 1, 2014, the complete subject matter of which is hereby incorporated by reference herein, in its entirety. An MCQ Application functional block may be used to interact between the PollsApp functional block and internal application functional blocks (e.g., the AT Application functional block, the CPE functional block, and the PollsApp functional block) to provide a single endpoint for operations. In addition, FIG. 10 illustrates a W9APP functional block that allows the end-user or prize vendor to provide the information needed to complete a United States Internal Revenue Form W9, once the end-user has reached a certain (e.g., $500) threshold in awards won. The W9App functional block may also inform the CPE functional block of the total awards to each end-user and the W9 status of the end-user for the fiscal year. The W9APP functional block may also keep the data of the CDW functional block up-to-date with every award amount and may generate an end-of-year fiscal report.

A Gaming functional block is also illustrated in FIG. 10. The Gaming functional block may be used to calculate credits and leader board scoring for all of the promotional game activities (e.g., sweepstakes and "Instant Wins") of end-users. In addition, a Sweepstakes Application (APP) functional block may act as the front end application that an end-user sees when accessing promotional activities via a web site or mobile application, as described above. The Sweepstakes Application functional block of FIG. 10 may interact heavily with the CPE functional block and the Platform functional block to perform the actions used to support promotional activities in the form of sweepstakes, as described above. Finally, the example architecture of FIG. 10 includes a Contest and Prizing Engine (CPE) functional block that may act as the core engine for sweepstakes and "Instant Wins." The CPE functional block of FIG. 10 may store information about all of the promotional activities, end-users, events, progress, and prizes. The CPE functional block may be responsible for processing the events, calculating end-user progress to give them an entry into a sweepstakes or "Instant Win," may act to select the winners, and to award points among many of the features of a system in accordance with the present disclosure.

Figure 11:
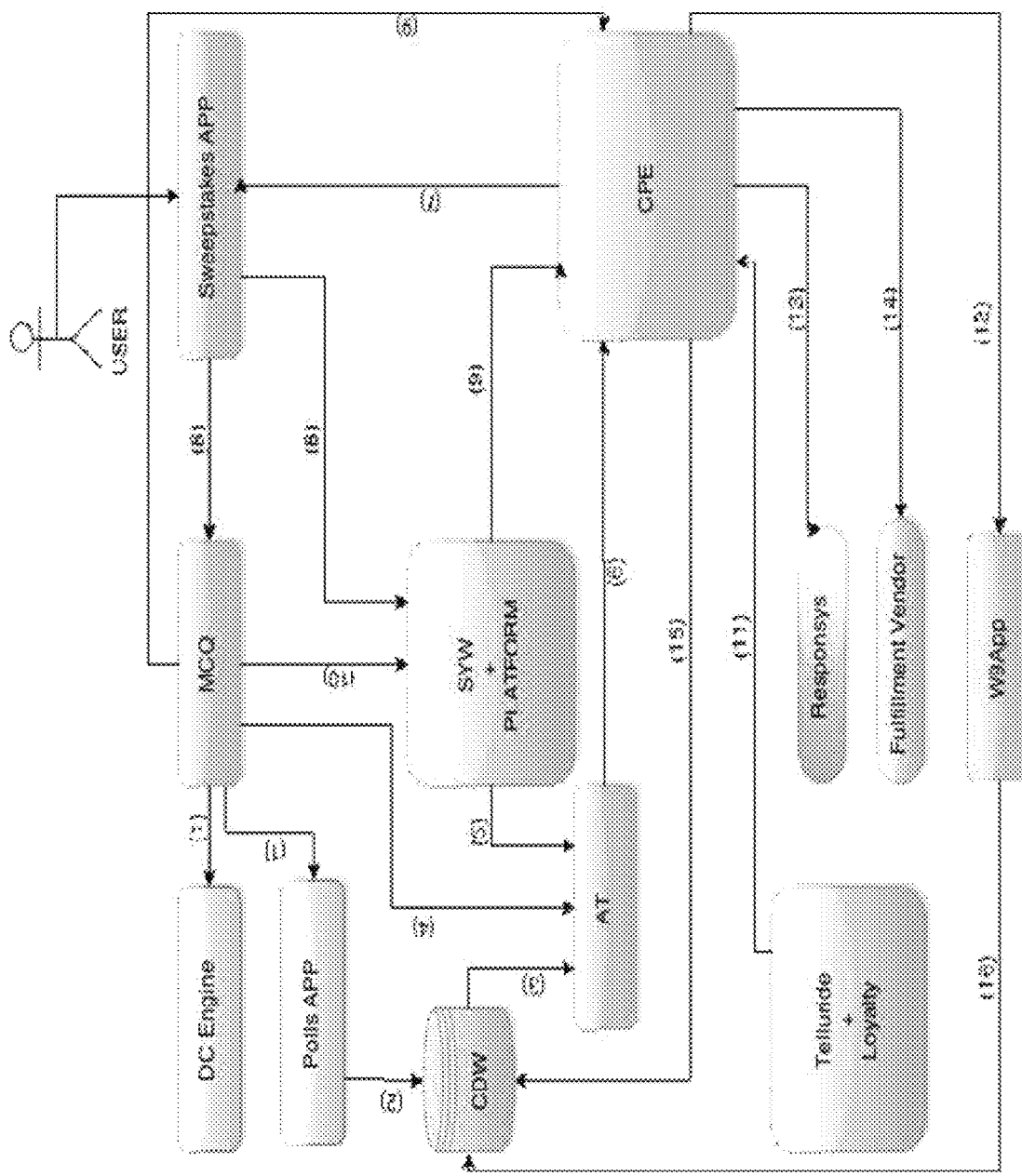
FIG. 11 is an exemplary data flow diagram that may correspond to data flows in the system architecture of FIG. 10, in accordance with the present disclosure.

FIG. 11 is an exemplary data flow diagram that may correspond to data flows in the system architecture of FIG. 10, in accordance with the present disclosure. The flow of data between the elements of FIG. 11 is used to support the various aspects of the method and system described above. It should be noted that the particular segmentation or division of system functionality and the data flows illustrated in FIG. 11 are for illustration purposes only, and that other functional organization may be employed in realizing an embodiment of the present disclosure. As illustrated in FIG. 11, the MCQ application functional block interacts (1) with the DC Engine functional block and the PollsApp Application functional block to retrieve questions to be posed to end-users, and to push forward the answers given by the end-users. The MCQ application functional block may also be used to create new information about end-user personal interests and polls to be sent to end-users related to the profile of the end-user. The results for the end-user interest polls (e.g., Promo_id, syw_id, question_id, choice_id) are sent (2) to the data storage of the CDW application functional block for use in creating and saving historical records. Those stored result may then be retrieved (3) by the AT application functional block to generate a polls report to the sponsor or operator of the system of the present disclosure. The AT application functional block interacts (4) with the MCQ functional block to create new polls and to select existing questions to be used as polls related to qualification of end-users to participate in new promotional activities (e.g., games). The AT application functional block may retrieve (5) data for platform content (e.g., related to tags and products) from the SYW functional block and the Platform functional block, which may be used for steps of new promotional activities.

After a newly created promotional activity has been confirmed, the data for the promotional activity may be sent (6) to the CPE functional block to enable the promotional activity to be activated. Once the promotional activity ends, all statistical data for the promotional activity may be requested by the AT application functional block to build analytic reports for the sponsor or operator of the promotional activity. Details of the promotional activity and the current end-user progress may be sent (7) to the Sweepstakes Application functional block, to make the promotional activity rendered and playable. The Sweepstakes Application functional block may then interact (8) with the MCQ functional block and the SYW functional block, to allow the end-user to make progress on steps of the promotional activity. The CPE functional block may receive (9) the interactions generated by the end-user on the SYW Application functional block and the MCQ functional block, which contain details about the action performed by the end-user, and the entities involved. When a poll of type "Profile" is sent to the end-user, the personal profile of that end-user is updated, based on responses to the poll. The Telluride functional block may provide (10) data for the personal profile of an end-user, as well as transaction history information for that end-user. The Telluride functional block may also expose an application program interface (11) to award the "reward points" or "loyalty points" to a winning end-user. The W9App functional block may track (12) the total awards for an end-user in the current fiscal year, and may allow the end-user to provide information for completion of a United States Internal Revenue Service Form W9, in the event that it is later needed, and may prohibit the end-user from being awarded a prize if the information needed to submit the Form W9 is not provided. The Responsys functional block may receive (13) data used for email notifications of end-users, and may send notifications to the end-users. The CPE functional block may send (14) a list of winners to vendors responsible for prize fulfilment, who then contact and provide the awarded prize to the end-user, and may receive confirmation from the responsible vendor(s) once fulfillment is complete. On a regular basis (e.g., daily, weekly), current information for active and recently ended promotional activities may be sent (15) to the data storage of the CDW functional block, to maintain historical records of promotional activities. In addition, information for all awards of prizes to end-users may be regularly sent (16) the data storage of the CDW functional block, for cross referencing with other system data and for maintenance of historical records.

Figure 12:
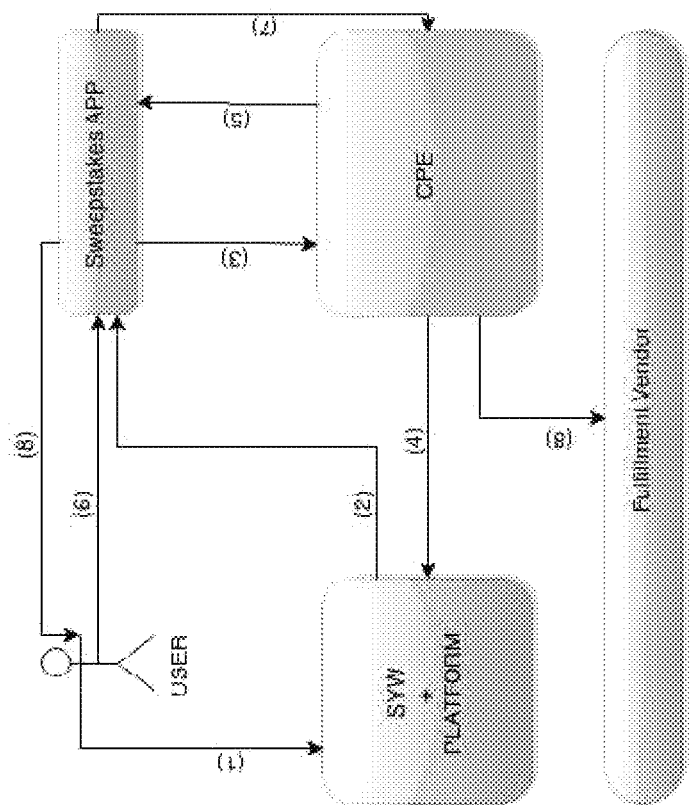
FIG. 12 is an exemplary data flow diagram, in accordance with the present disclosure.

FIG. 12 is an exemplary data flow diagram, in accordance with the present disclosure. The flow of data between the elements of FIG. 12 is used to support the various aspects of the method and system described above. It should be noted that the particular segmentation or division of system functionality and the data flows illustrated in FIG. 12 are for illustration purposes only, and that other functional organization may be employed in realizing an embodiment of the present disclosure. As illustrated in FIG. 12, an end-user, navigating a web site according to an embodiment of the present disclosure may find a particular product item that he would like to win. As described above, an embodiment of the present disclosure may provide a button, icon, or badge that may provide the end-user with a chance to instantly win that product item. In response to the end-user clicking on/selecting the button, icon, or badge, the SYW functional block may open (2) a new hypertext markup language (HTML) "iframe," and pass a product identifier to the Sweepstakes Application functional block, which may then render output to be displayed by the "iframe." Using the product identifier, the Sweepstakes Application functional block may then make a call (3) to an application program interface of the CPE functional block, to determine whether there is an active "Instant Win" that meets the criteria for the end-user selected product item (e.g., product category, price, and availability). The CPE functional block may then call (4) an application program interface function of the Platform functional block to retrieve product information (e.g., prize+ availability) for the product item. Once the above operations have been completed and the CPE functional block has determined whether a matching promotional activity exists (5), information about the promotional activity will be rendered by the Sweepstakes Application (i.e., displayed in the "iframe") or the end-user will be informed that there is no currently active promotional activity to win the end-user selected product item. The user may then qualify for (6) the promotional activity (e.g., respond to a poll for an "Instant Win" game), and the CPE functional block may then register (7) the end-user entry and proceed to determine whether the end-user is a winner. Finally, the end-user may be informed (8) of the outcome of the promotional activity (i.e., whether the end-user won), and if the end-user won the promotional activity, the Fulfillment Vendor functional block may then validate and deliver the award to the winning end-user.

Figure 13:
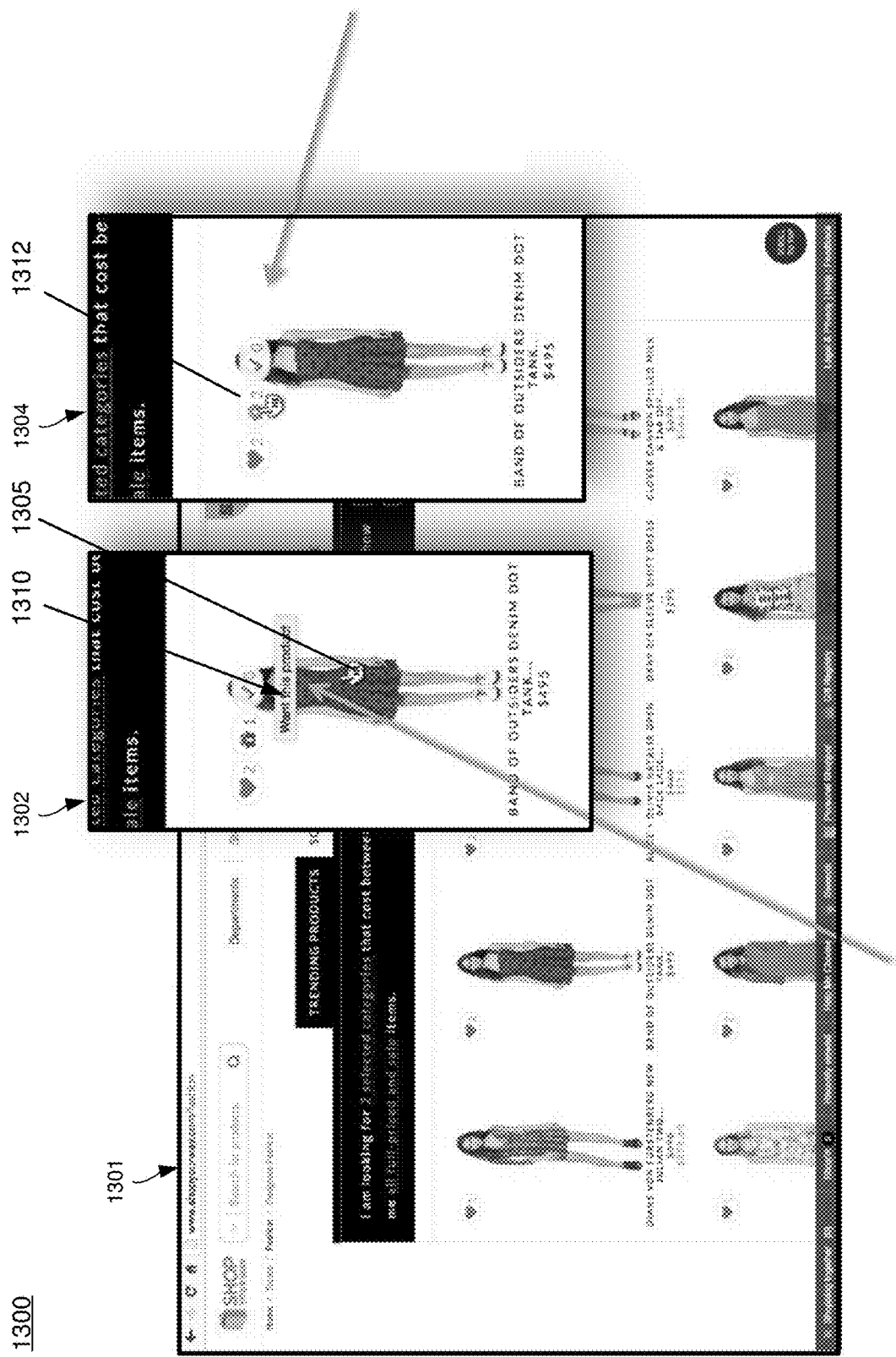
FIG. 13 is an illustration of a screen image of an example web page showing two pop-up windows, in accordance with the present disclosure.

FIG. 13 is an illustration of a screen image 1300 of an example web page 1301 showing two pop-up windows, in accordance with the present disclosure. In the example of FIG. 13, in a left pop-up window 1302, hovering over an image of the product item may cause display of a "Want this Product" icon 1310. The end-user may then click-on/select the "Want this Product" icon 1310 to add the illustrated product item to their "Wish List." The addition of the product item to the "Wish List" of the end-user is then shown by the increase in the number of items in the "Wish List" icon of the end-user 1312.

Figure 14:
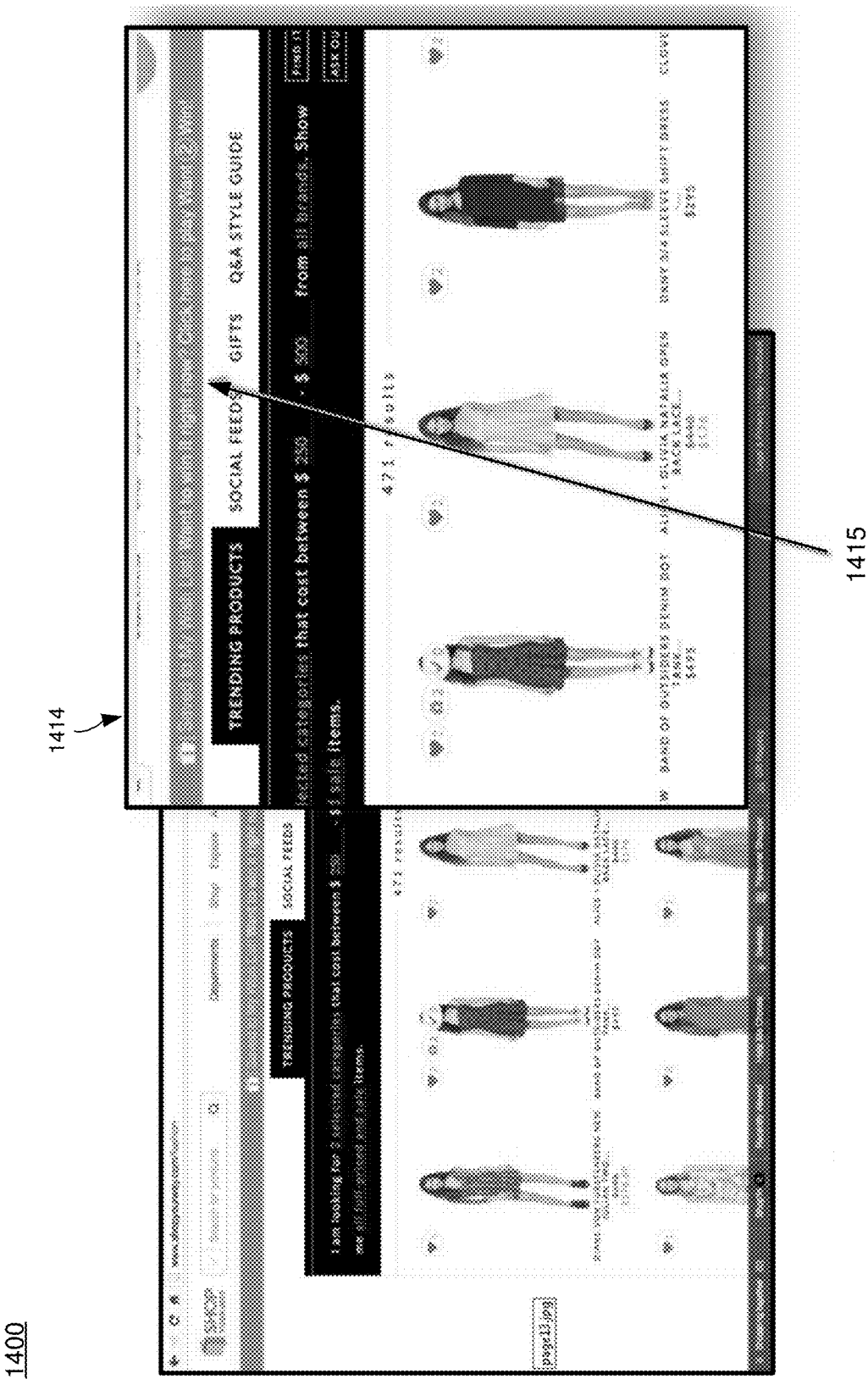
FIG. 14 illustrates a screen image of an example showing a notification, in accordance with the present disclosure.

FIG. 14 illustrates a screen image 1400 of an example showing a notification 1415, in accordance with the present disclosure. The notification 1415 informs the end-user in a pop-up window 1414 of a web page that a user-selected product item, such as the product item show in the pop-up windows 1302, 1034 of FIG. 13 has been added to the "Wish List" of the end-user. In addition, the notification 1415 tells the end-user that they may play a promotional activity such as, for example, an "Instant Win" game for a chance to immediately win the product item just added to the "Wish List:" by the end-user.

Figure 15:
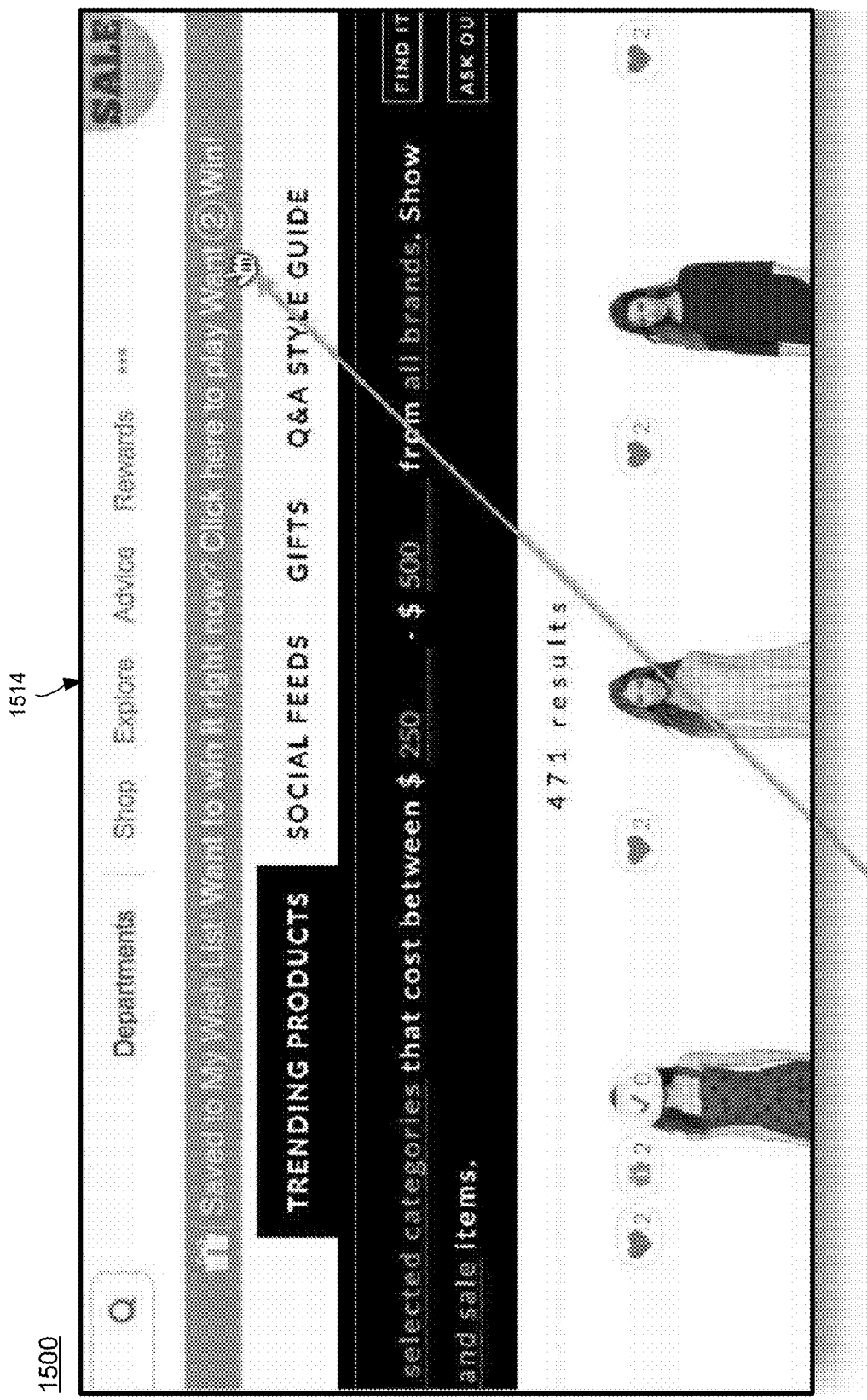
FIG. 15 is an illustration of a screen image of a pop-up window that may appear in a web page, requesting end-user confirmation of their intent to play a promotional activity for a chance to immediately win the illustrated product, in accordance with the present disclosure.

FIG. 15 is an illustration of a screen image 1500 of a pop-up window 1616 that may appear in a web page, requesting end-user confirmation of their intent to play a promotional activity for a chance to immediately win the illustrated product, in accordance with the present disclosure.

Figure 16:
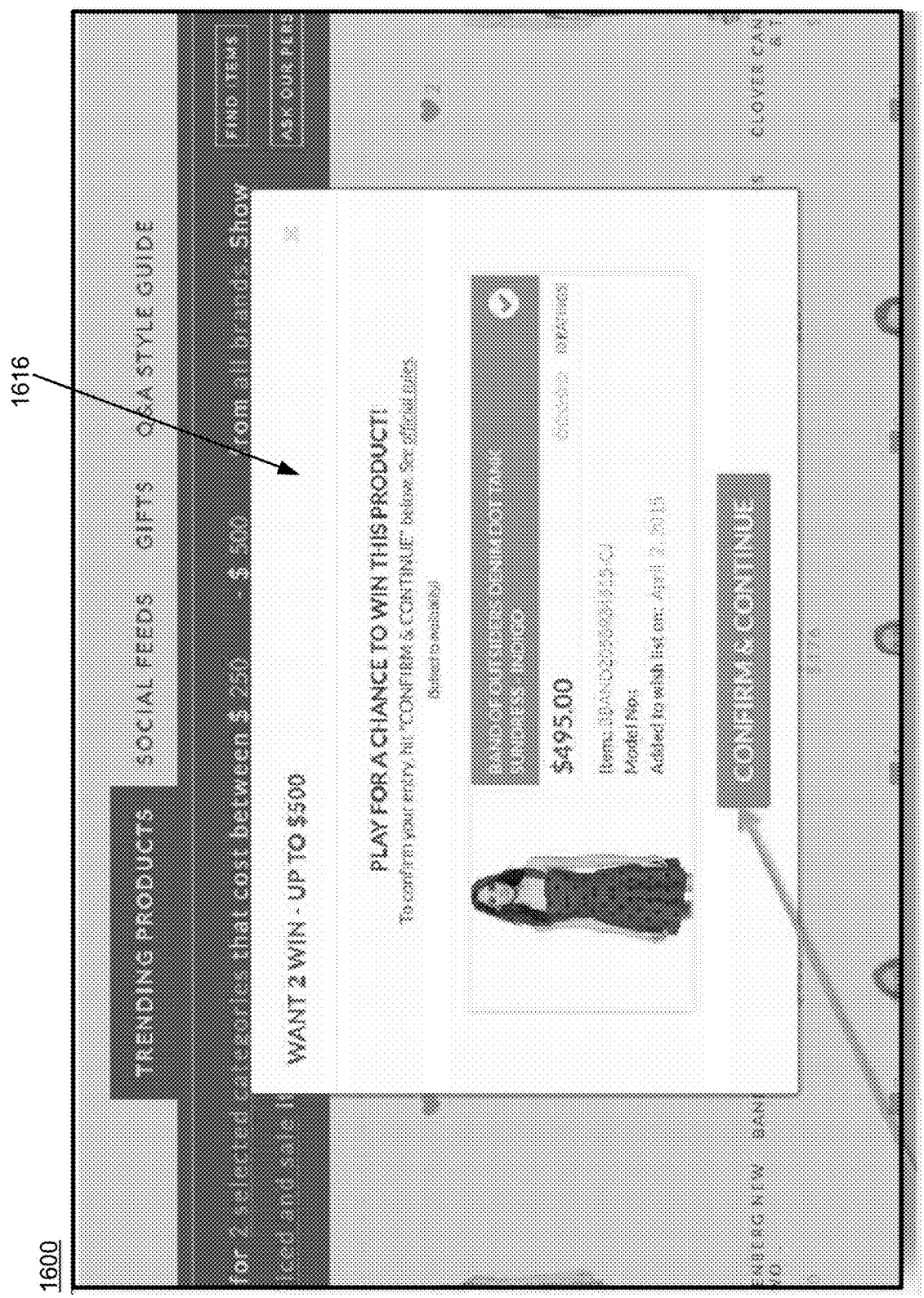
FIG. 16 is an illustration of a screen image showing a pop-up window that may correspond to, for example, the pop-up window shown in the screen image of FIG. 14, in which the cursor has been moved to select a chance to play an "Instant Win" promotional activity, in accordance with the present disclosure.

FIG. 16 is an illustration of a screen image 1600 showing a pop-up window 1614 that may correspond to, for example, the pop-up window 1414 shown in the screen image 1400 of FIG. 14, in which the cursor 1520 has been moved to select a chance to play an "Instant Win" promotional activity, in accordance with the present disclosure.

Figure 17:
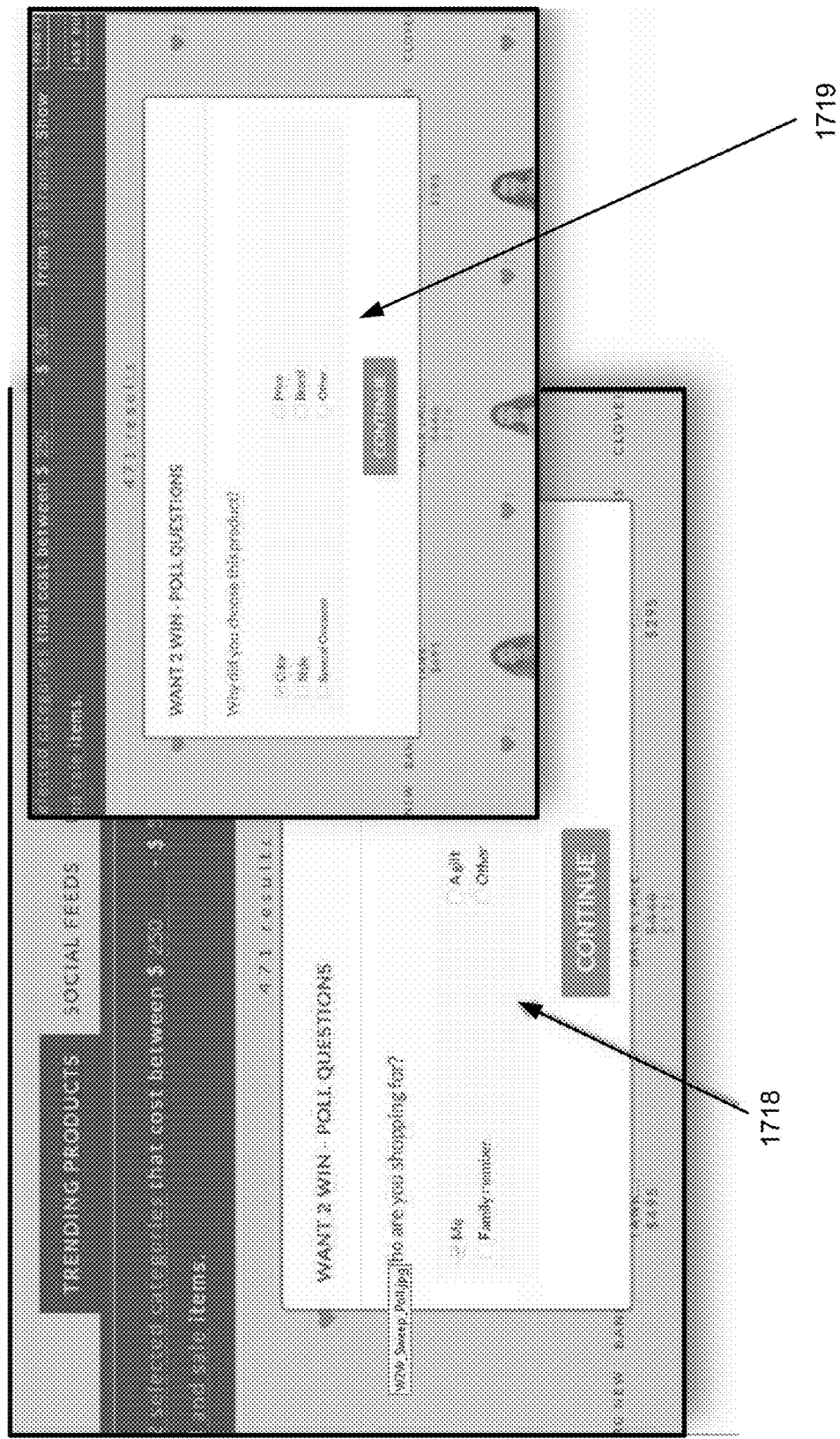
FIG. 17 illustrates two pop-up windows showing example poll questions that may be displayed to an end-user wishing to take part in an "Instant Win" promotional activity for a chance to immediately win the product item selected in FIG. 13, in accordance with the present disclosure.

FIG. 17 illustrates two pop-up windows 1718, 1719 showing example poll questions that may be displayed to an end-user wishing to take part in an "Instant Win" promotional activity for a chance to immediately win the product item selected in FIG. 13, in accordance with the present disclosure.

Figure 18:
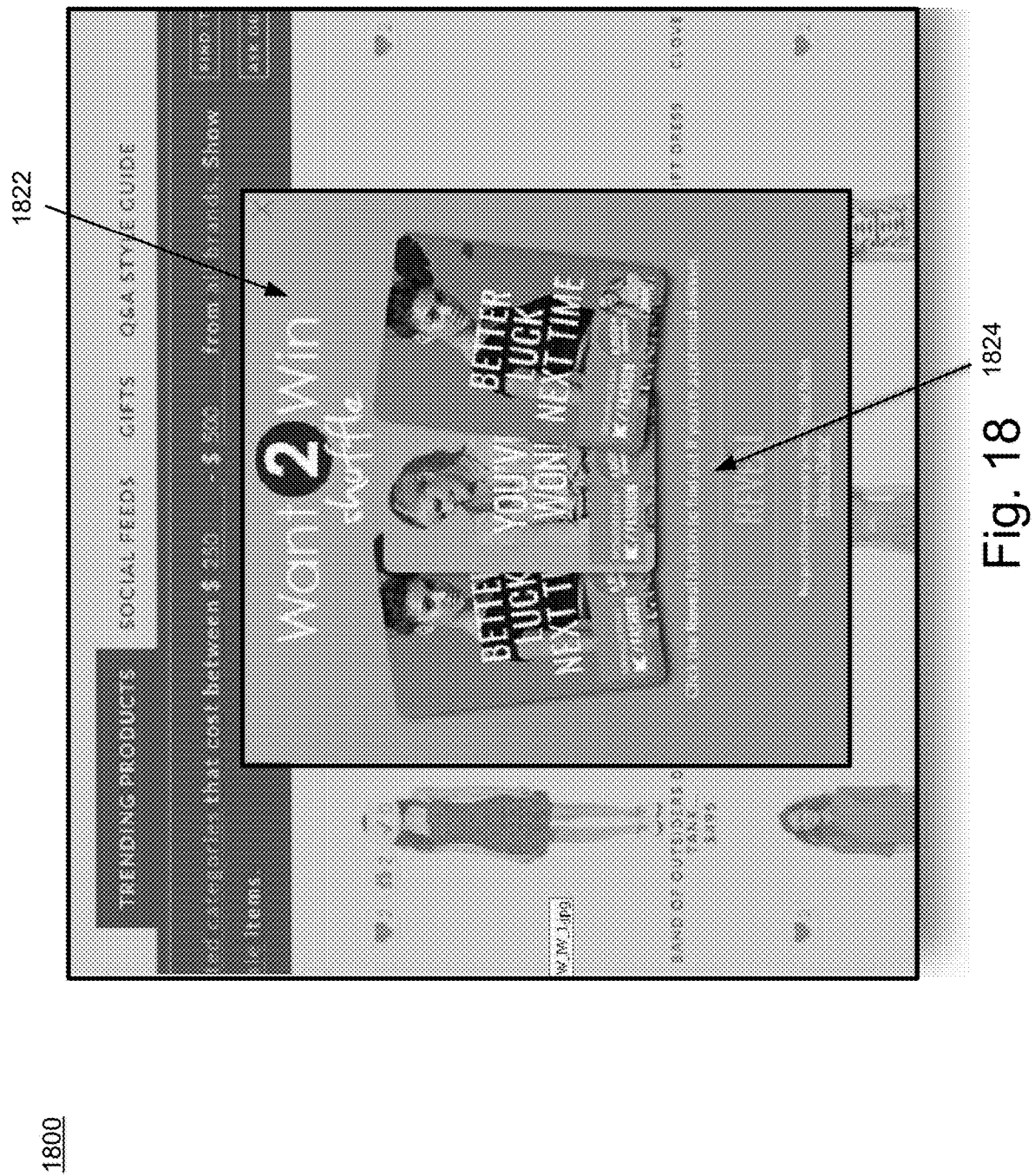
FIG. 18 that shows a web page pop-up window that may be used to notify an end-user of the outcome of an "Instant Win" promotional activity, in accordance with the present disclosure.

FIG. 18 that shows a web page pop-up window 1822 that may be used to notify an end-user of the outcome of an "Instant Win" promotional activity, in accordance with the present disclosure. The end-user may click-on/select the "Reveal" button 1824 to find out the results of the "Instant Win" game.

Figure 19:
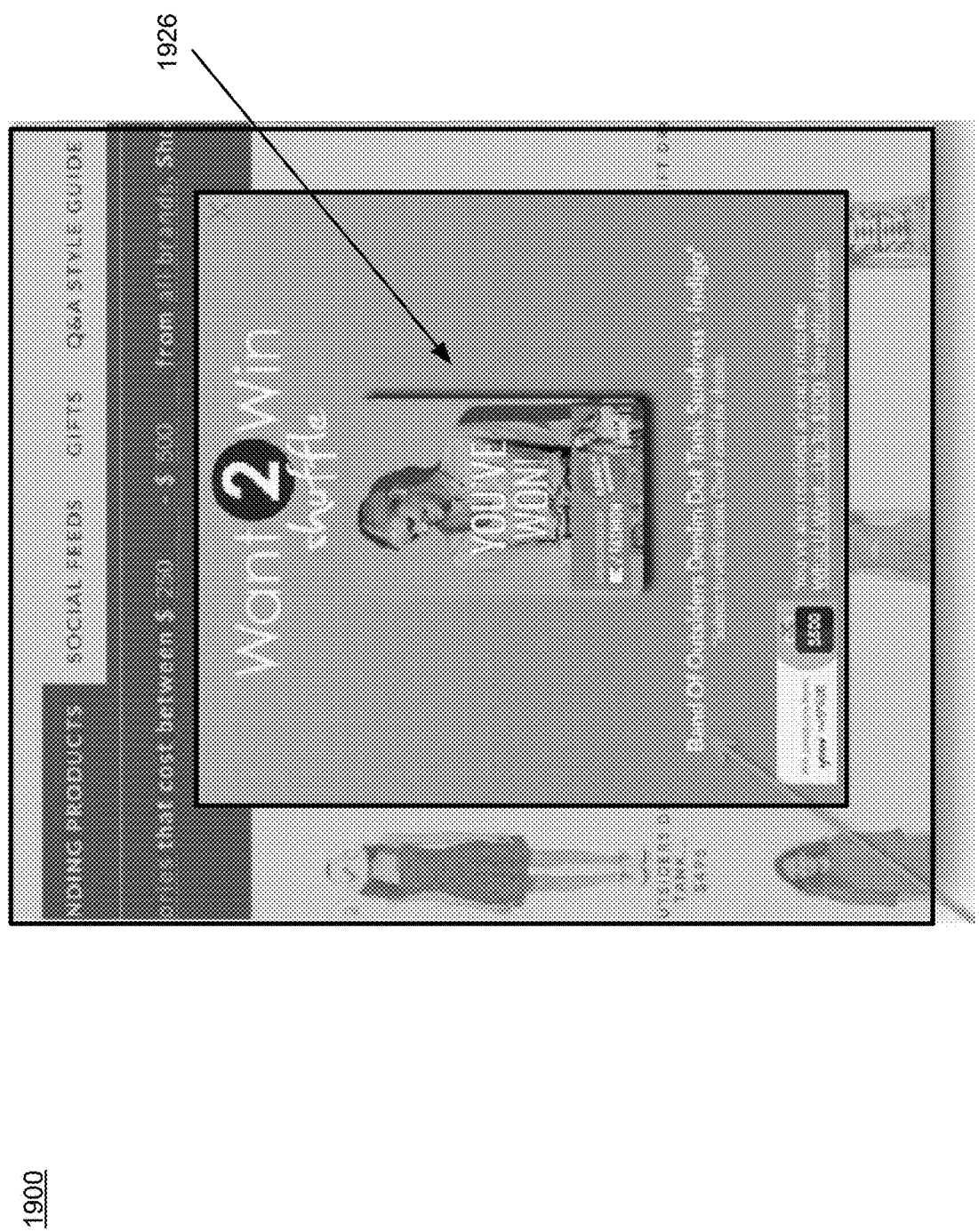
FIG. 19 illustrating a web page pop-up window that may be used to notify an end-user that the end-user has won an "Instant Win" promotional activity, in accordance with a representative embodiment of the present disclosure.

FIG. 19 illustrating a web page pop-up window 1926 that may be used to notify an end-user that the end-user has won an "Instant Win" promotional activity, in accordance with a representative embodiment of the present disclosure. The end-user may click-on/select the "Reveal" button 1824 to find out the results of the "Instant Win" game as shown in FIG. 19.

Figure 20:
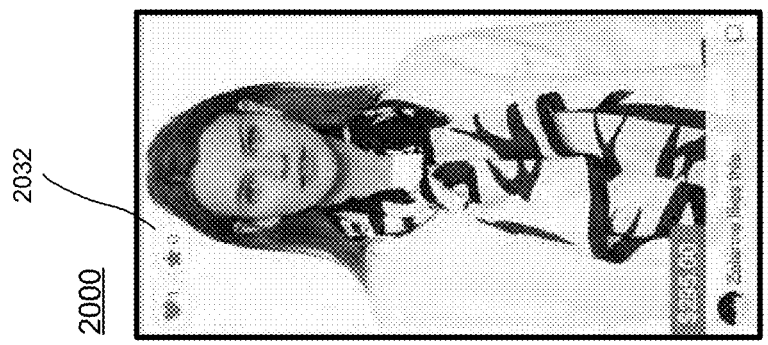
FIG. 20 is an illustration of an example product quick-view window for a product item, showing an "Add to Wish List" icon that includes a numeric count of the items in the "Wish List," in accordance with a representative embodiment of the present disclosure.

FIG. 20 is an illustration of an example product quick-view window 2000 for a product item, showing an "Add to Wish List" icon 2032 that includes a numeric count of the items in the "Wish List," in accordance with a representative embodiment of the present disclosure. In the example of FIG. 20, the "Wish List" of the end-user contains no saved product items, as indicated by the "0" shown in the "Add to Wish List" icon 2032.

Figure 21:
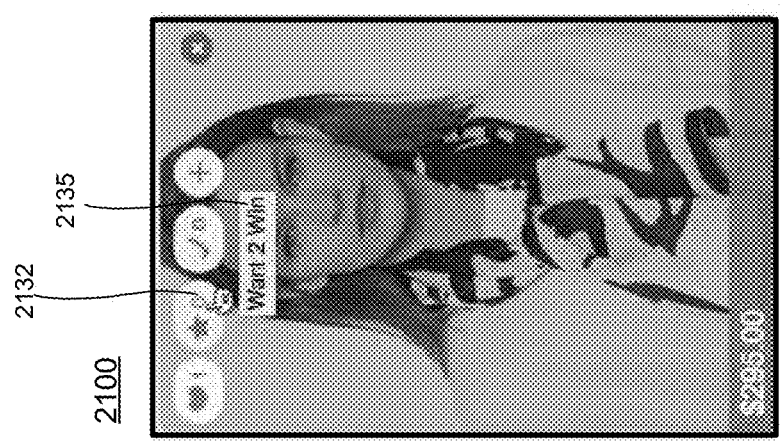
FIG. 21 show an illustration of an example product quick view window in which the end-user has "moused-over" or hovered the cursor over the "Add to Wish List" icon, resulting in the display of the "Want 2 Win" icon/button, in accordance with a representative embodiment of the present disclosure.

FIG. 21 show an illustration of an example product quick view window 2100 in which the end-user has "moused-over" or hovered the cursor over the "Add to Wish List" icon 2132, resulting in the display of the "Want 2 Win" icon/button 2135, in accordance with a representative embodiment of the present disclosure. The display of the "Want 2 Win" icon 2135 provides the end-user with a chance to try to immediately win the illustrated product item, by simply clicking on/selecting the "Want 2 Win" icon 2135.

Figure 22:
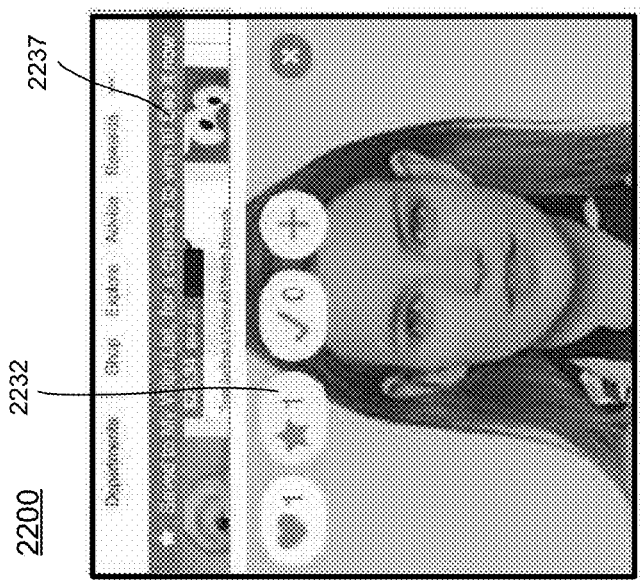
FIG. 22 shows an example of a product quick view window that may be displayed following end-user selection of a button, icon or badge similar to the "Want 2 Win" icon of FIG. 21, in accordance with a representative embodiment of the present disclosure.

FIG. 22 shows an example of a product quick view window 2200 that may be displayed following end-user selection of a button, icon or badge similar to the "Want 2 Win" icon 2135 of FIG. 21, in accordance with a representative embodiment of the present disclosure. As shown in the example of FIG. 22, the count of items in the "Wish List" of the end-user, as displayed in the "Add to Wish List" icon 2232, has increased from that shown in icon 2132 in FIG. 21. Further, the illustration of FIG. 22 shows a notification 2237 informing the end-user that the item illustrated in FIG. 21 has been added to the "Wish List" of the end-user, and that the end-user may try for a chance to immediately win the illustrated product item.

Figure 23:
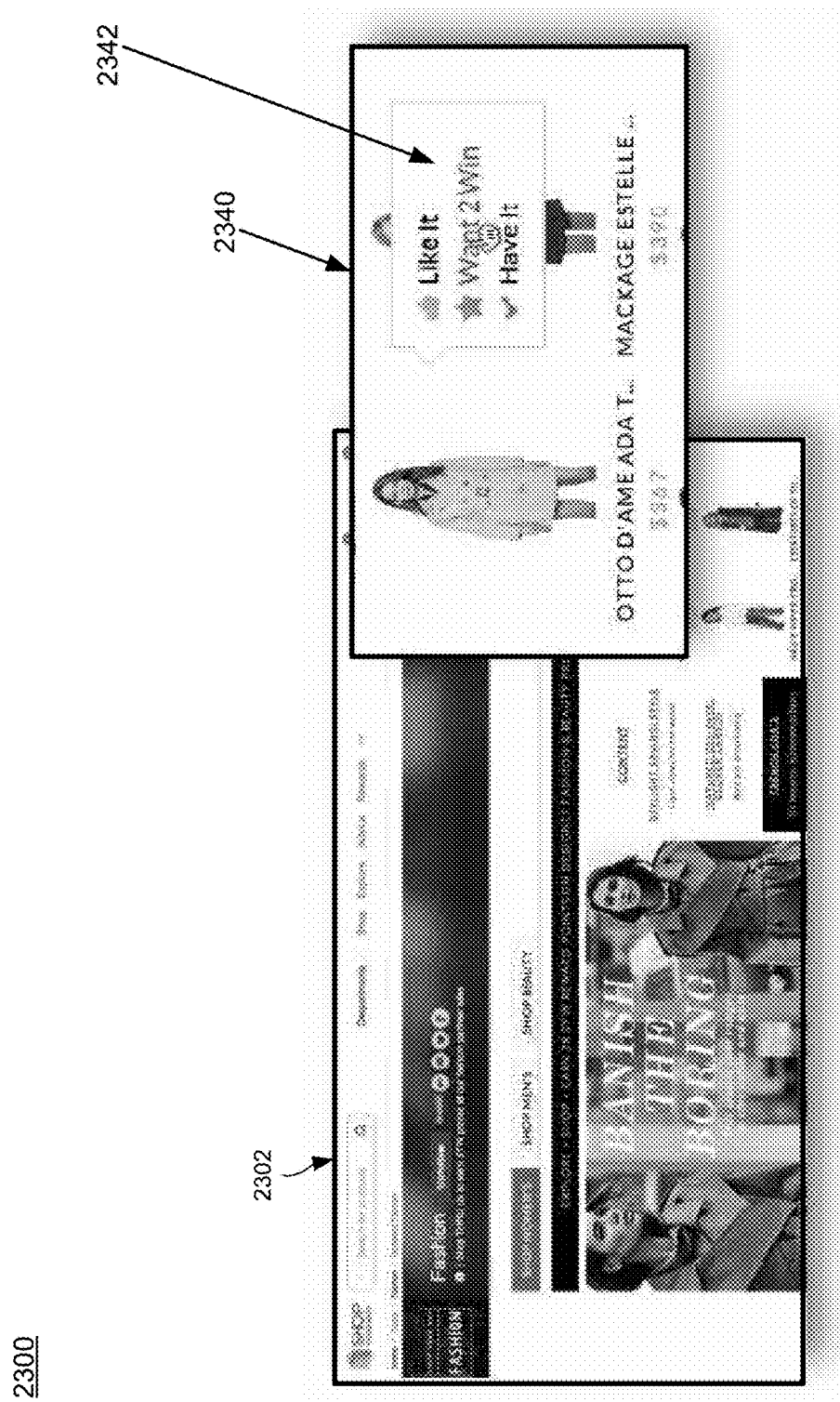
FIG. 23 is an illustration of a web page and an example pop-up window with pop-up menu, in accordance with another representative embodiment of the present disclosure.

FIG. 23 is an illustration of a web page 2302 and an example pop-up window 2340 with pop-up menu 2342, in accordance with another representative embodiment of the present disclosure. As shown in FIG. 23, the end-user may select a "Want 2 Win" on from the pop-up menu 2342, for a chance to immediately win the illustrated product.

Figure 24:
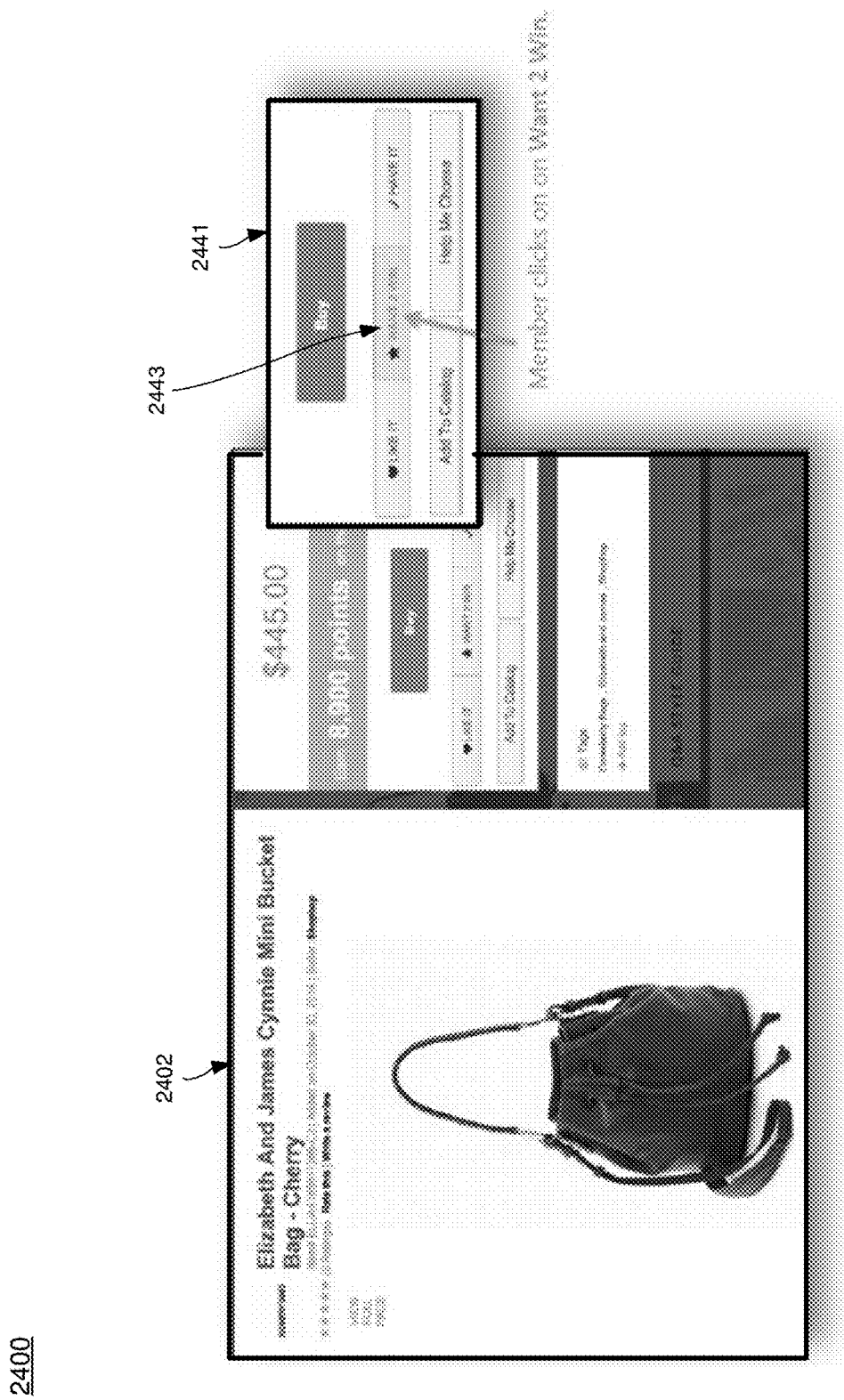
FIG. 24 illustrates an example product quick view that shows an enlargement of a menu portion having a "Want 2 Win" button, in accordance with another representative embodiment of the present disclosure.

FIG. 24 illustrates an example product quick view 2402 that shows an enlargement 2441 of a menu portion having a "Want 2 Win" button 2443, in accordance with another representative embodiment of the present disclosure. As illustrated in FIG. 24, the end-user may select the "Want 2 Win" button 2443 for a chance to immediately win the illustrated product.

Figure 25A:
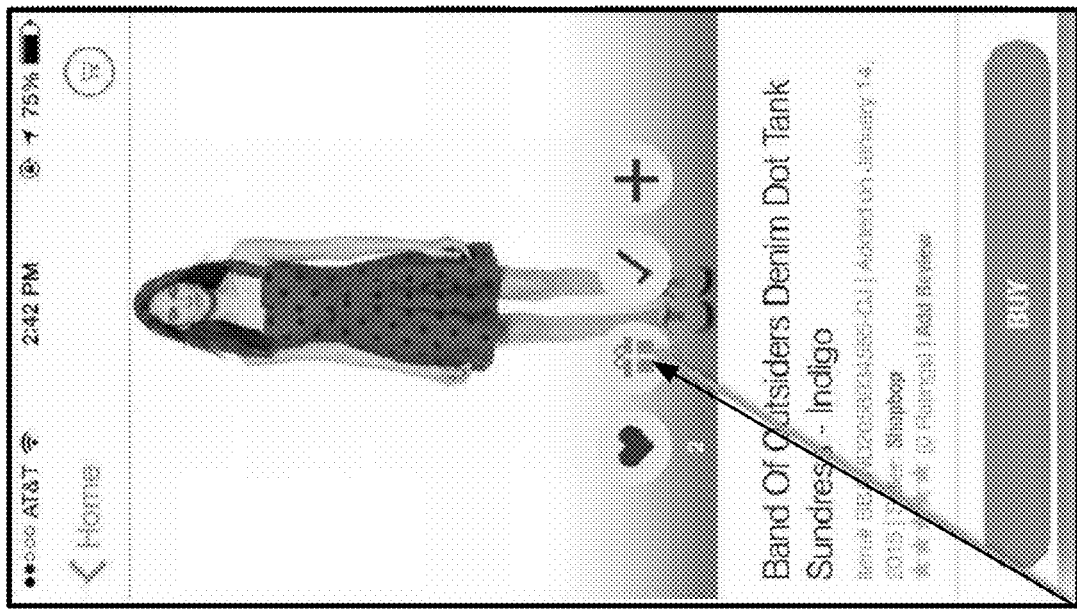
FIGS. 25A and 25 B illustrate two example screens of a mobile application, in accordance with a representative embodiment of the present disclosure.
Figure 25B:
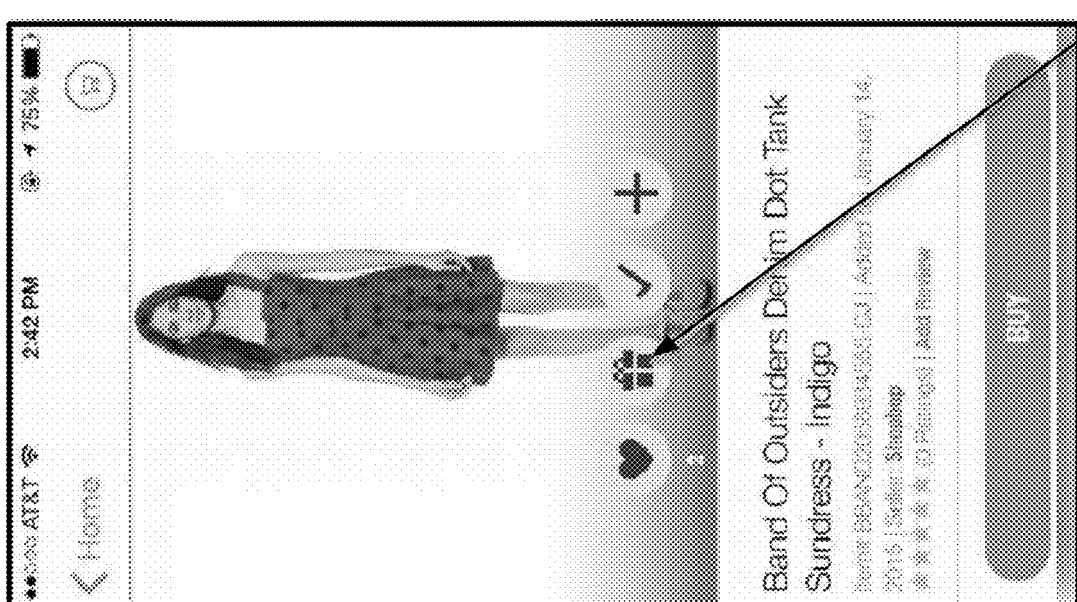

FIGS. 25A and 25B illustrate two example screens 2500A, 2500B of a mobile application, in accordance with a representative embodiment of the present disclosure. The illustration of FIG. 25A shows an inactive (i.e., not in contact with the finger of the end-user) "Add to Wish List" icon 2532A, while FIG. 25B shows an active (i.e., currently selected by the finger of the end-user) "Add to Wish List" icon 2532B.

Figure 26:
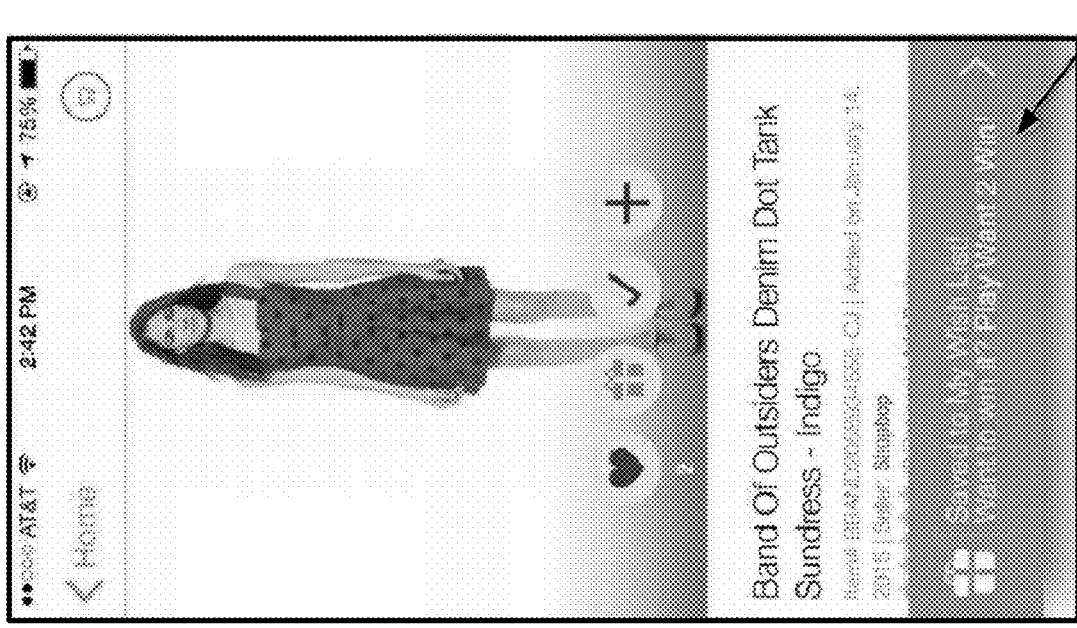
FIG. 26 show an illustration of an example screen of a mobile application containing a notification of a promotional activity, in accordance with a representative embodiment of the present invention.

FIG. 26 show an illustration of an example screen 2600 of a mobile application containing a notification of a promotional activity, in accordance with a representative embodiment of the present invention. In the illustration of FIG. 26, a notification 2646 informs the end-user of the opportunity to try for a chance to immediately win the illustrated product by simply clicking on/selecting the text of the notification 2646, in the manner described above.

Figure 27:
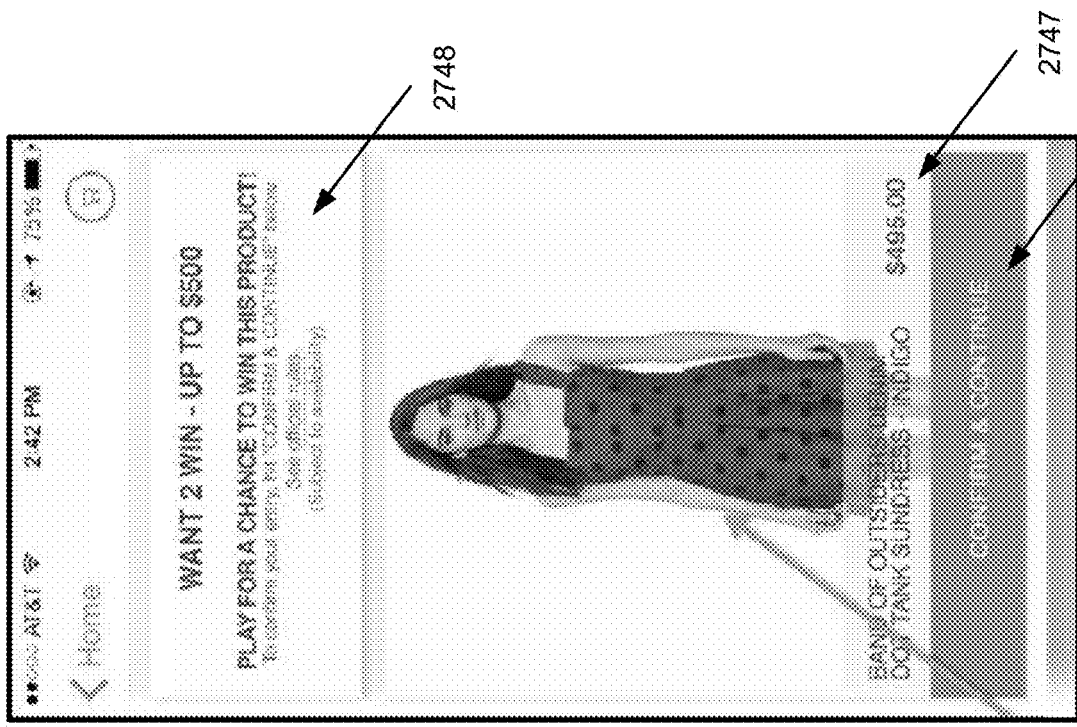
FIG. 27 illustrates an example screen of a mobile application showing a notification that a promotional activity (e.g., an "Instant Win" or "Want 2 Win") is available for which the illustrated product item is eligible to be a prize, in accordance with a representative embodiment of the present disclosure.

FIG. 27 illustrates an example screen 2700 of a mobile application showing a notification 2748 that a promotional activity (e.g., an "Instant Win" or "Want 2 Win") is available for which the illustrated product item 2747 is eligible to be a prize, in accordance with a representative embodiment of the present disclosure. The screen 2700 includes a "Confirm & Continue" button 2749 that permits the end-user to indicate their intent to try for a chance to win the product item illustrated in the screen 2700.

Figure 29:
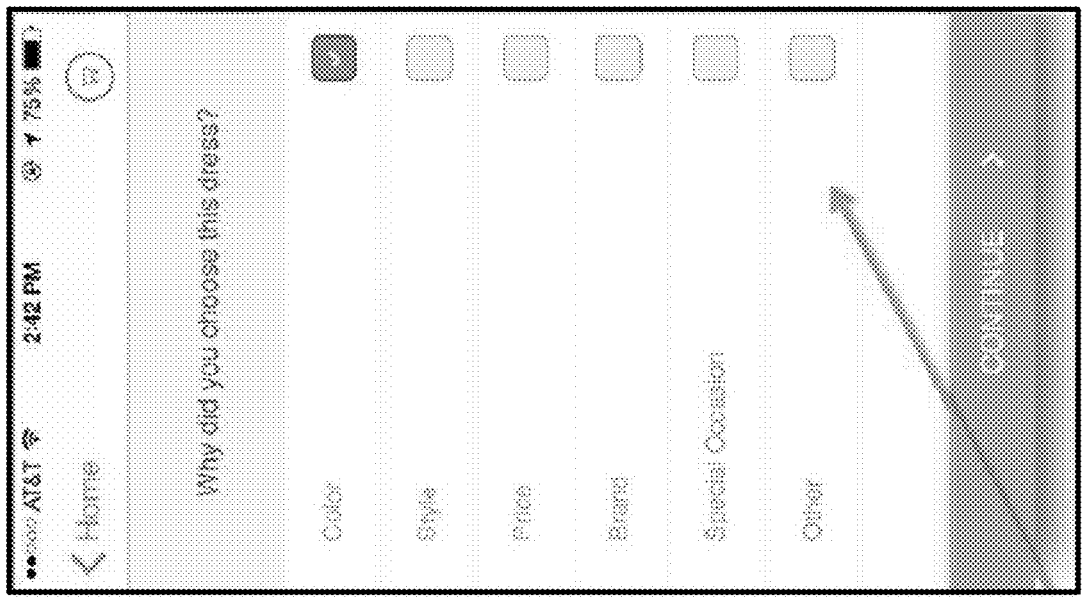
FIGS. 28 and 29 illustrate two example screens showing poll questions presented to an end-user following their confirmation of interest in trying for a chance to win the product item shown in a prior screen such as the screen of FIG. 27, in accordance with a representative embodiment of the present disclosure.
Figure 28:
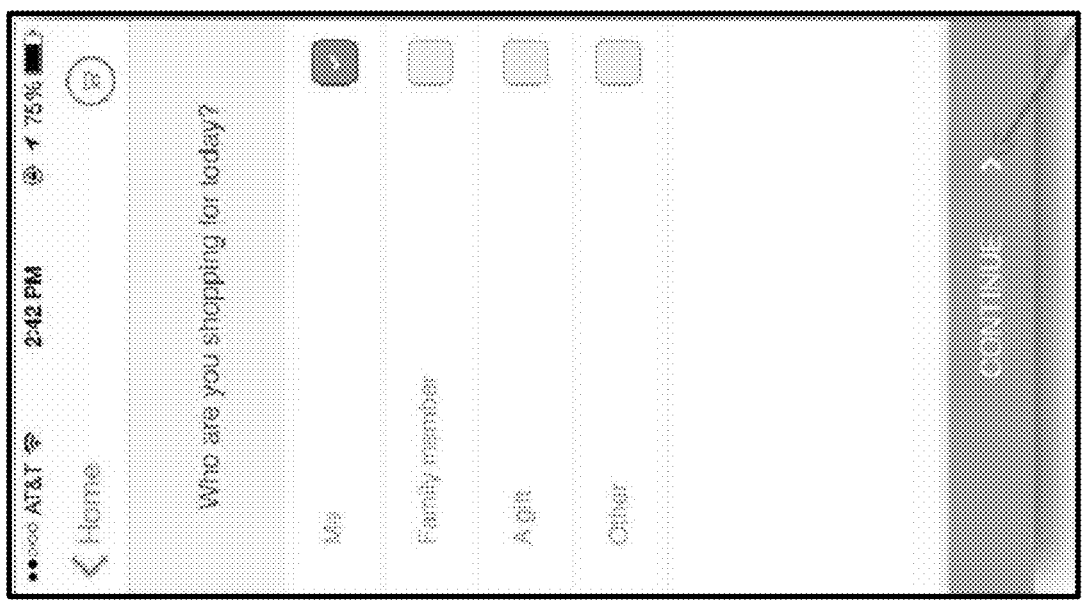

FIGS. 28 and 29 illustrate two example screens 2800, 2900 showing poll questions presented to an end-user following their confirmation of interest in trying for a chance to win the product item shown in a prior screen such as the screen 2700 of FIG. 27, in accordance with a representative embodiment of the present disclosure. As discussed above, the end-user responses to the questions displayed in screens 2800, 2900 may be used to provide additional insight into the interests, preferences, interpersonal relationships and social graph of the end-user. In exchange, the end-user is given a chance to immediately win a product item of interest to the end-user (i.e., in this example, the sundress shown in the illustrations of FIGS. 25A-27). As discussed previous, above, a representative embodiment of the present disclosure may also make available as prizes, items selected from other than a current screen or web page, and instead from collections of items selected by the end-user such as, for example, a product item selected from the contents of a "Wish List" or "Personal Catalog" of the end-user that meets the criteria for a promotional activity such as an "Instant Win."

Figure 30:
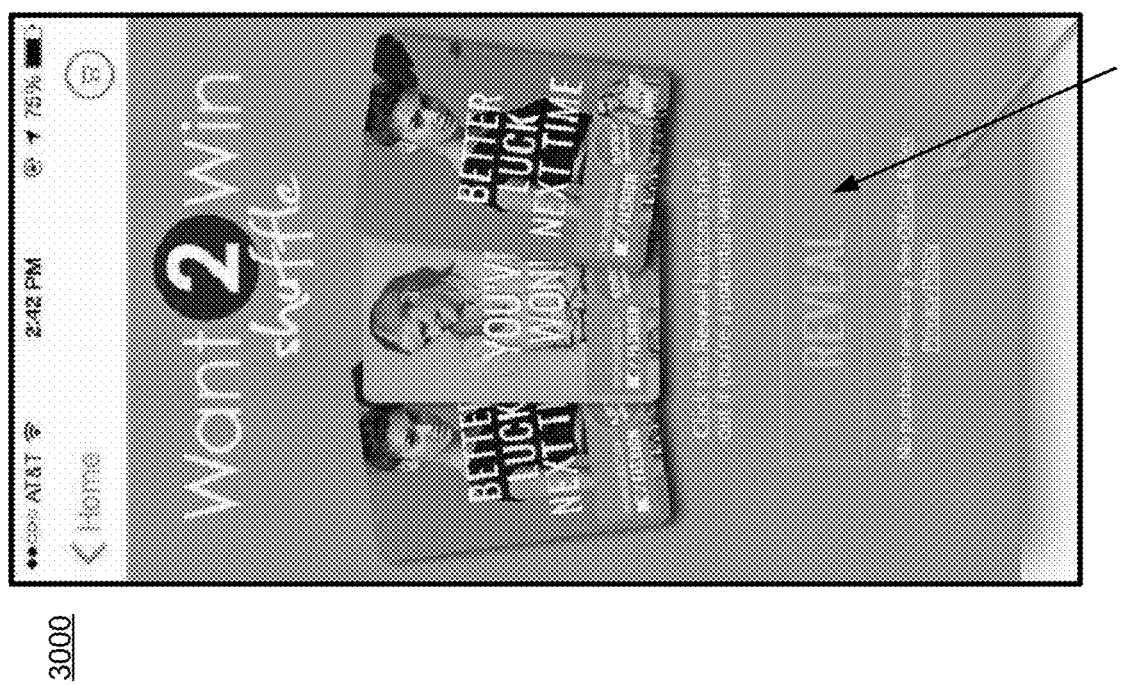
FIG. 30 shows an example screen of a mobile application that may be used to notify an end-user of the outcome of an "Instant Win" promotional activity, similar in many ways to the pop-up window of the web page of FIG. 18, in accordance with the present disclosure.

FIG. 30 shows an example screen 3000 of a mobile application that may be used to notify an end-user of the outcome of an "Instant Win" promotional activity, similar in many ways to the pop-up window 1822 of the web page 1800 of FIG. 18, in accordance with the present disclosure. The end-user may click-on/select the "Reveal" button 3024 to find out the results of the "Instant Win" game.

Figure 31:
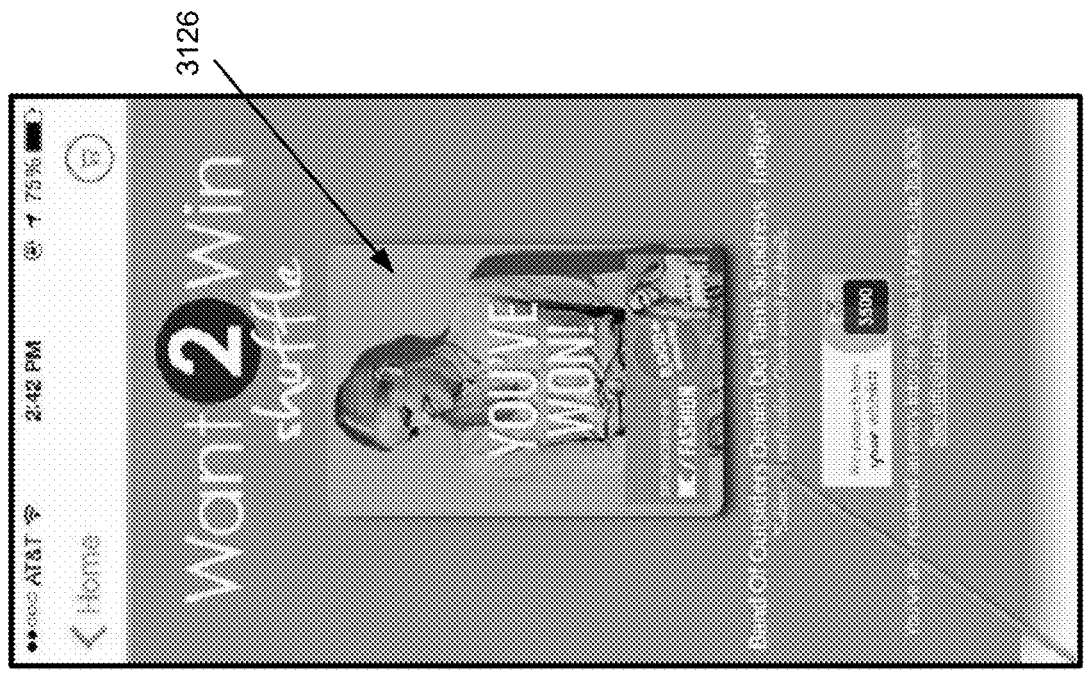
FIG. 31 illustrates an example screen of a mobile application that may be used to notify an end-user that the end-user has won an "Instant Win" promotional activity, similar in many ways to the pop-up window shown in FIG. 19, in accordance with a representative embodiment of the present disclosure.

FIG. 31 illustrates an example screen 3100 of a mobile application that may be used to notify an end-user that the end-user has won an "Instant Win" promotional activity, similar in many ways to the pop-up window 1926 shown in FIG. 19, in accordance with a representative embodiment of the present disclosure. The end-user may click-on/select the "Reveal" button 3024 of FIG. 30 to find out the results of the "Instant Win" game as shown in FIG. 31.

Figure 32:
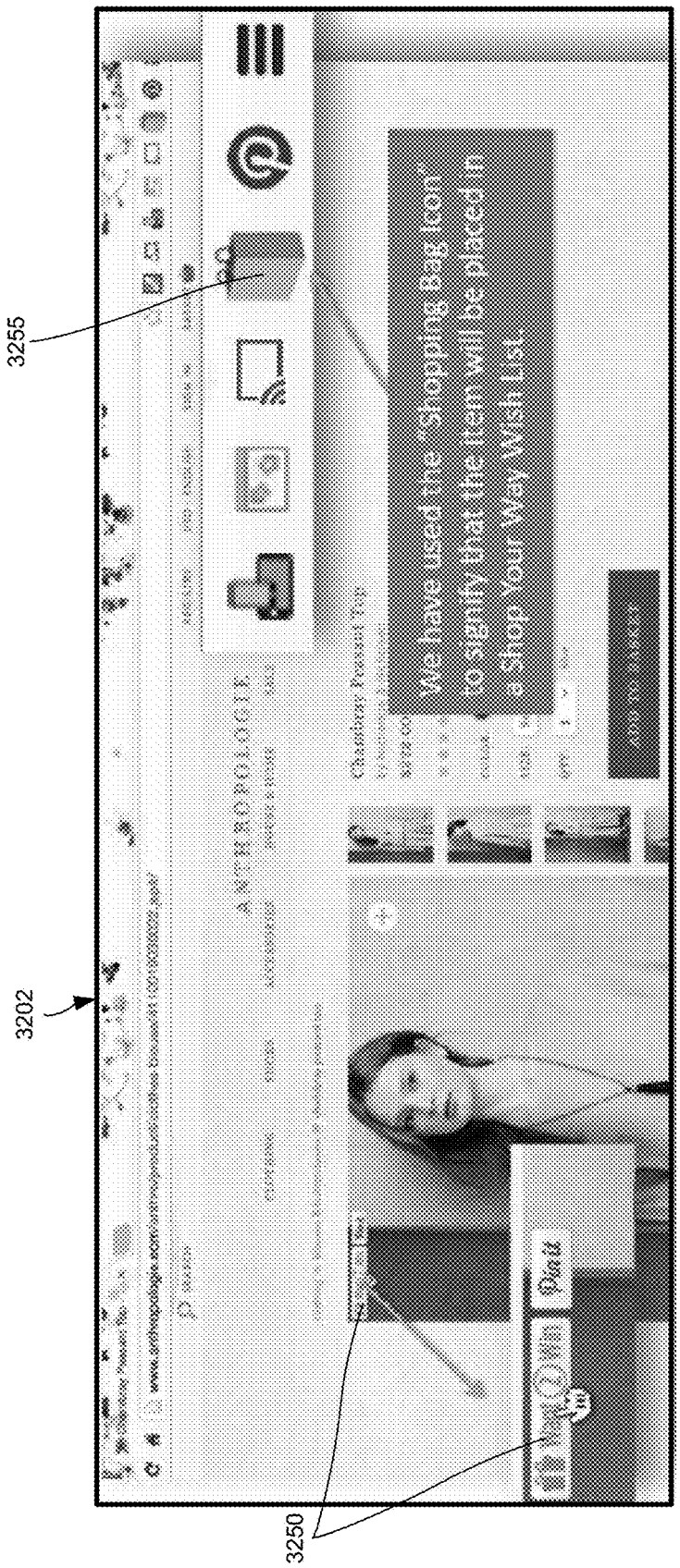
FIG. 32 illustrates an example web page that may be a web page of a third party web site operator, where the web page displays an icon that may be added to the web page by an end-user, in accordance with a representative embodiment of the present invention.

FIG. 32 illustrates an example web page 3202 that may be a web page of a third party web site operator, where the web page 3202 displays an icon 3250 that may be added to the web page 3202 by an end-user, in accordance with a representative embodiment of the present invention. The icon 3250 may provide end-user access to promotional game activities such as those described herein, on web pages of arbitrary third party web sites. Such functionality may be enabled through the use of an associated software "plug-in" that may work synergistically with certain web browsers employed by end-users. In some instances, a third party web site operator may choose to add the icon 3250 to web pages visited by end-users, to enable the web site visitors having the associated plug-in to have the opportunity to benefit from the promotional activities such as those described herein. The presence of the appropriate plug-in may be indicated to the end-user by a graphic such as the icon 3255 shown in FIG. 32.

Figure 33:
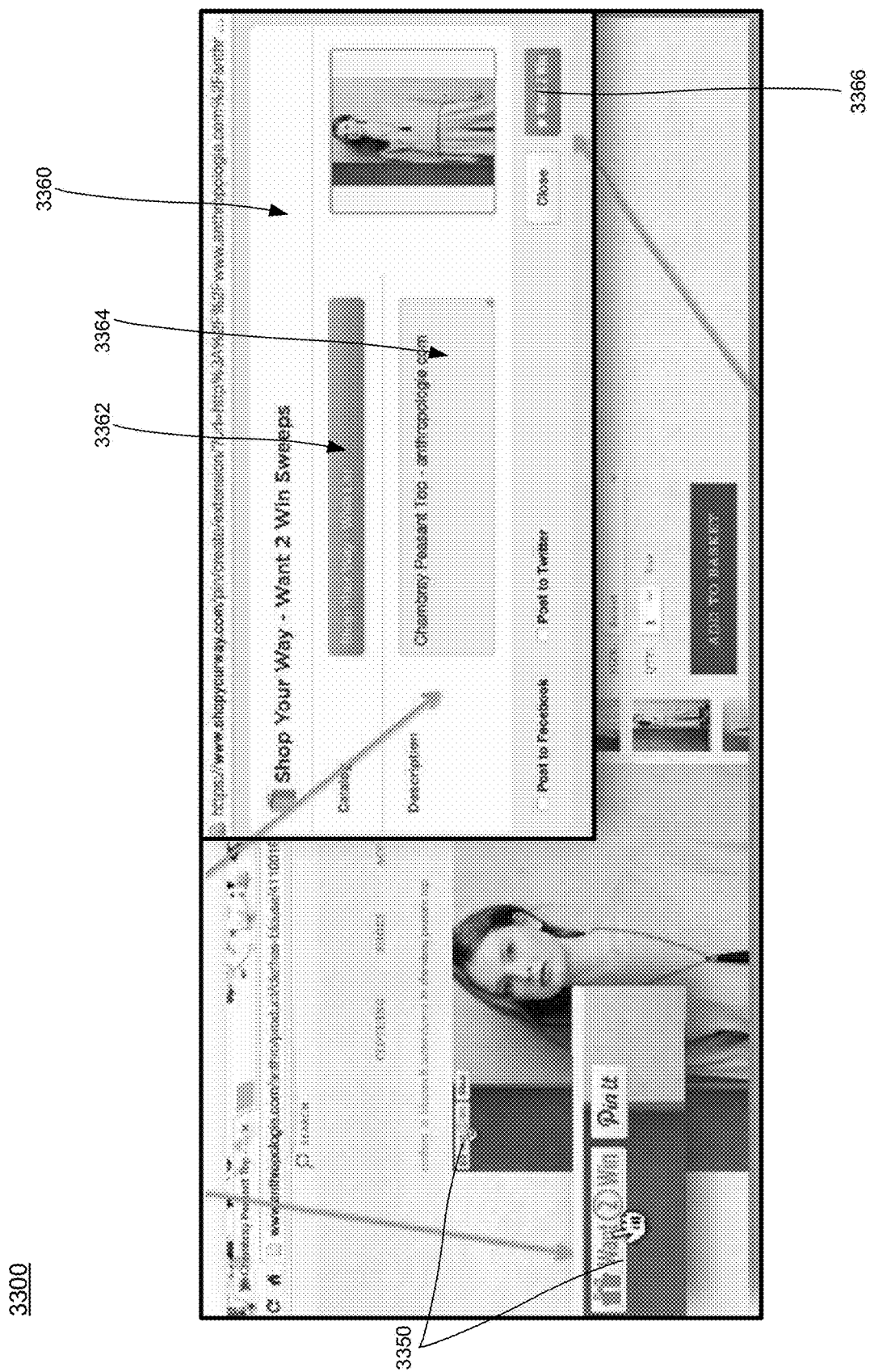
FIG. 33 shows an illustration of an example web page that may correspond to web page of FIG. 32, which may be a web page of a third party web site operator, where the web page displays an icon that may be added to the web page by an end-user, in accordance with a representative embodiment of the present invention.

FIG. 33 shows an illustration of an example web page 3302 that may correspond to web page 3202 of FIG. 32, which may be a web page of a third party web site operator, where the web page 3302 displays an icon 3350 that may be added to the web page 3202 by an end-user, in accordance with a representative embodiment of the present invention. In the illustration of FIG. 33, an end-user has scrolled the mouse over and clicked upon the icon 3350, causing the display of an additional web page or pop-up window that provides the end-user with a text field 3362 to identify the personal catalog within which information about the identified product item 3364 may be stored. The illustration of FIG. 33 also includes a button 3366 that permits the end-user to request participation in a promotional activity such as an "Instant Win," to allow the user a chance to immediately win the illustrated product.

Figure 34:
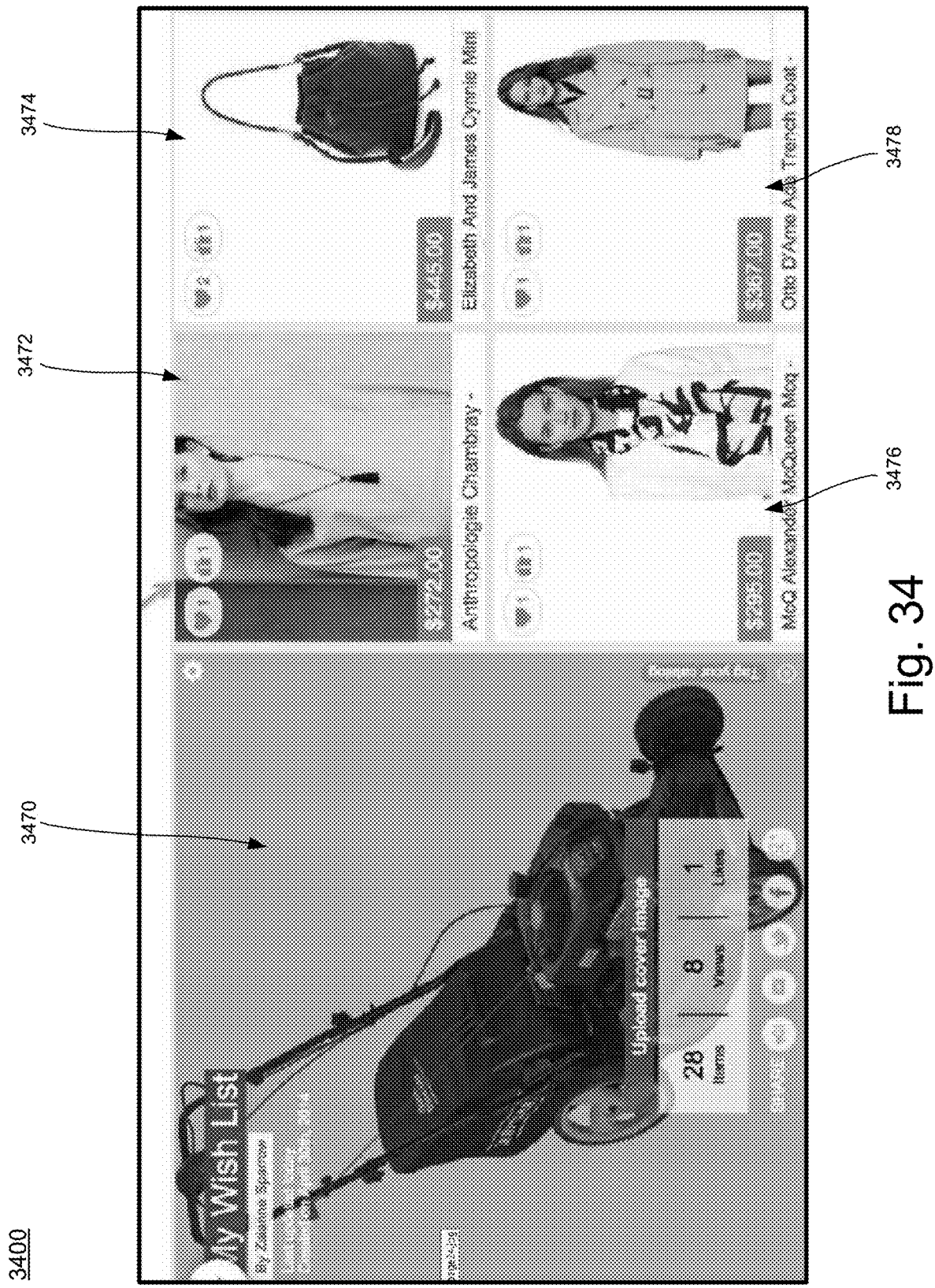
FIG. 34 is an illustration of an example web page for a "Wish List" of an end-user, in accordance with a representative embodiment of the present disclosure.

FIG. 34 is an illustration of an example web page for a "Wish List" of an end-user, in accordance with a representative embodiment of the present disclosure. The illustration of FIG. 34 shows a product image 3470 that may be used by the end-user to visually represent the personal catalog as a whole, and four product quick views 3472, 3474, 3476, 3478 that show the four product items that the end-user has added to the personal catalog of FIG. 34.

Figure 35:
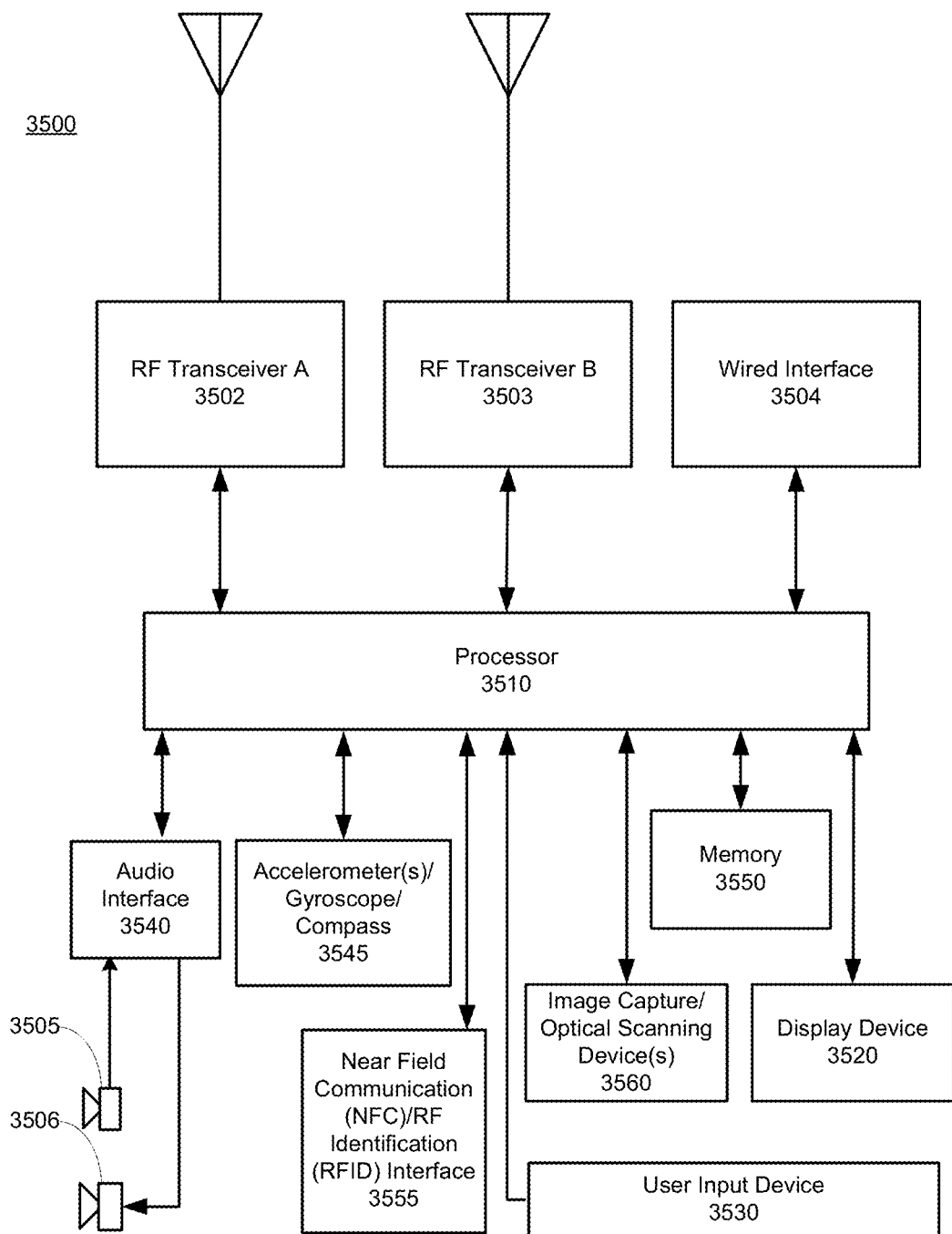
FIG. 35 is a block diagram illustrating a personal electronic device that may correspond, for example, to electronic devices shown in FIG. 1, in accordance with a representative embodiment of the present disclosure.

FIG. 35 is a block diagram illustrating a personal electronic device 3500 that may correspond, for example, to electronic devices 20', 20', 20" shown in FIG. 1, in accordance with a representative embodiment of the present disclosure. The personal electronic device 3500 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 35, the personal electronic device 3500 includes a processor 3510, an RF transceiver A 3502, an RF transceiver B 3503, a wired interface 3504, a display device 3520, a user input device 3530, an audio interface 3540, and a memory 3550. The processor 3510 may be, for example, a suitable microprocessor or microcomputer having sufficient computing power to control the personal electronic device 3500, and is operably coupled to the RF transceiver A 3502, the RF transceiver B 3503, and the wired interface 3504. The RF transceiver A 3502 and RF transceiver B 3503 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, or any other wireless network known now or in the future. The wired interface 3504 may comprise any necessary circuitry, logic, and software/firmware for wired communication over any of, for example, an Ethernet, Universal Serial Bus, FireWire (IEEE 1394) or other wired networks known now or in the future.

The processor 3510 is also operably coupled to the memory 3550, and may be used for non-transitory storage of executable program instructions, parameters, and data for any of the circuitry of the personal electronic device 3500. The display device 3520 is also operably coupled to the processor 3510, and may comprise, for example, one or more LED, OLED, LCD, or other form of visual display capable of presenting text or graphics, and may comprise any circuitry, logic, or software/firmware to support, for example, a graphical user interface (GUI). The user input device 3530 may comprise, for example, suitable switches, buttons, or touch sensitive surfaces to enable user control and operation of the personal electronic device 3500, and may comprise any necessary circuitry, logic, and software/firmware to allow it to perform those functions. In a representative embodiment of the present disclosure, the user input device 3530 may be a touch sensitive surface at the viewing side of the display device 3520, enabling a user to use the touch sensitive surface of the display device to enter user inputs and respond to displayed information. The audio interface 3540 comprises any necessary circuitry, logic, and software to interface a microphone 3505 and a speaker 3506 to the processor 3510.

Aspects of the present disclosure may be seen in a method of operating a system for assessing personal preferences and interests of end-users by engaging one or more end-users in a game in which the end-user may be given a chance to win a product item from a collection of product items selected by the end-user. Such a method may comprise creating, in memory of a computer system configured to communicate with user devices of a plurality of end-users, a representation of each of one or more first games of chance, wherein each representation of a first game of chance comprises a respective starting point in time, a respective ending point in time, a respective maximum number of prizes to be awarded, and a respective set of criteria. The method may also comprise, for each first game of chance of the one or more first games of chance, creating in memory of the computer system, a representation of a prize instance for each of the respective maximum number of prizes to be awarded. The representation of each prize instance may comprise a point in time assigned randomly within a time interval defined by the respective starting point in time and the respective ending point in time of the first game of chance, and an indicator representative of whether the prize instance is available to be awarded. Such a method may also comprise receiving an end-user request to participate in one first game of chance of the one or more first games of chance at a particular point in time, wherein the request comprises information identifying the end-user and information identifying a product item having associated characteristics, and determining whether the characteristics of the product item meet the criteria of any of the one or more first games of chance. A method in accordance with the present disclosure may also comprise storing the information identifying the product item in the collection of product information of the end-user, if the characteristics of the product item do not meet the criteria of any of the one or more first games of chance. The method may comprise selecting one first game of chance from the one or more first games of chance based upon the characteristics of the product item and the respective criteria of each of the one or more first games of chance, if the characteristics of the product item meet the criteria of at least one of the one or more first games of chance. The method may further comprise awarding the product item to the end-user, if the particular point in time is the same as or after the point in time assigned to at least one prize instance of the selected first game of chance and the indicator of the at least one prize instance indicates the at least one prize instance is available to be awarded.

In various representative embodiment of the present disclosure, the set of criteria may comprise one selected from the group of: a product price range, a product category, a product manufacturer, a product brand, and a product designer, and the characteristics may comprise one selected from the group of: a product price, a product category, a product manufacturer, a product brand, and a product designer. The collection of product information of the end-user may comprise a collection of information for specific product items selected by the end-user while browsing a particular e-commerce web site, for persistent storage by the particular e-commerce web site after leaving the particular e-commerce web site. In some representative embodiments of the present disclosure, awarding the product item to the end-user may comprise setting the indicator of the at least one prize instance so that the at least one prize instance is no longer available to be awarded; and scheduling delivery of the product item to the end-user.

A representative embodiment of the present disclosure may comprise requesting information from the end-user regarding one or both of a reason for end-user selection of the product item and a relationship of the end-user to an intended recipient of the product item; and updating one or both of personal interest and product preference information of the end-user maintained by the computer system, based upon the requested information. The method may also comprise determining whether the end-user has exhausted a set number of chances to win a prize within a set period of time; and entering the end-user into a second game of chance that awards a prize by selecting a winner from those of the plurality of end-users that have entered the second game of chance.

Additional aspects of the present disclosure may be found in a non-transitory computer-readable medium having stored thereon a plurality of instructions executable by at least one processor of a computer system configured to communicatively couple with communication devices of a plurality of end-users. The plurality of instructions may cause the at least one processor to perform the actions of a method of operating a system for assessing personal preferences and interests of end-users by engaging one or more end-users in a game in which the end-user may be given a chance to win a product item from a collection of product items selected by the end-user, and the actions may comprise those of the method described above.

Yet other aspects of the present disclosure may be observed in a system for assessing personal preferences and interests of end-users by engaging one or more end-users in a game in which the end-user may be given a chance to win a product item from a collection of product items selected by the end-user. Such a system may comprise at least one processor of a computer system for communicatively coupling with communication devices of a plurality of end-users, and the at least one processor may be operable to, at least, perform the actions of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer implemented method, the method comprising:

storing in at least one memory a plurality of games of chance, wherein each game of chance comprises a respective starting point in time, a respective ending point in time, a respective maximum number of prizes to be awarded, and a respective set of criteria;

for each game of chance, storing in the at least one memory a representation of a prize instance for each of the respective maximum number of prizes to be awarded, wherein the representation of each prize instance comprises a point in time assigned randomly by at least one processor within a time interval defined by the respective starting point in time and the respective ending point in time of each game of chance, and wherein the representation of each prize instance comprises an indicator representative of whether the prize instance is available to be awarded;

receiving by the at least one processor, at a particular point in time, a request from an end-user to participate, wherein the request comprises information identifying the end-user and information identifying a product item having associated characteristics;

determining by the at least one processor whether the characteristics of the product item meet the criteria of any of the one or more games of chance;

storing the information identifying the product item in a collection of product information of the end-user in the at least one memory, in response to the at least one processor determining that the characteristics of the product item do not meet the criteria of any of the plurality of games of chance, wherein the collection of product information of the end-user comprises specific product items selected by the end-user while browsing an e-commerce web site, and wherein the e-commerce web site stores the collection of product information of the end-user in the at least one memory after the end-user leaves the e-commerce web site;

selecting by the at least one processor a particular game of chance with the fewest criteria from the plurality of games of chance based upon the characteristics of the product item, in response to the at least one processor determining that the characteristics of the product item meets the criteria of at least one of the plurality of games of chance; and awarding by the at least one processor the product item to the end-user, if the particular point in time is at or after the point in time assigned to at least one prize instance of the particular game of chance and the indicator of the at least one prize instance indicates the at least one prize instance is available to be awarded.

2. The computer implemented method according to claim 1, wherein the set of criteria comprises one selected from the group of: a product price range, a product category, a product manufacturer, a product brand and a product designer.

3. The computer implemented method according to claim 1, wherein the characteristics comprise one selected from the group of: a product price, a product category, a product manufacturer, a product brand, and a product designer.

4. The computer implemented method according to claim 1, wherein awarding the product item to the end-user comprises:
   setting the indicator of the at least one prize instance so that the at least one prize instance is no longer available to be awarded; and
   scheduling delivery of the product item to the end-user.

5. The computer implemented method according to claim 1, wherein the method comprises:
   requesting information from the end-user regarding one or both of a reason for selecting the product item and a relationship of the end-user to an intended recipient of the product item; and
   updating one or both of personal interest and product preference information of the end-user maintained by the computer system, based upon the requested information.

6. The computer implemented method according to claim 1, wherein the method comprises:
   determining whether the end-user has exhausted a set number of chances to win a prize within a set period of time; and
   entering the end-user into a different game of chance.

7. A non-transitory computer-readable medium having stored thereon a plurality of instructions executable by at least one processor of a computer system, the plurality of instructions to cause the at least one processor to perform the actions of a method, the actions comprising:
   storing a plurality of games of chance, wherein each game of chance comprises a respective starting point in time, a respective ending point in time, a respective maximum number of prizes to be awarded, and a respective set of criteria;
   for each game of chance, storing a representation of a prize instance for each of the respective maximum number of prizes to be awarded, wherein the representation of each prize instance comprises a point in time assigned randomly within a time interval defined by the respective starting point in time and the respective ending point in time of each game of chance, and wherein the representation of each prize instance comprises an indicator representative of whether the prize instance is available to be awarded;
   receiving, at a particular point in time, a request from an end-user to participate, wherein the request comprises information identifying the end-user and information identifying a product item having associated characteristics;
   determining whether the characteristics of the product item meet the criteria of any of the one or more games of chance;
   storing the information identifying the product item in a collection of product information of the end-user, if the characteristics of the product item do not meet the criteria of any of the plurality of games of chance, wherein the collection of product information of the end-user comprises specific product items selected by the end-user while browsing an e-commerce web site, and wherein the e-commerce web site stores the collection of product information of the end-user in persistent storage after the end-user leaves the e-commerce web site;
   selecting a particular game of chance with the fewest criteria from the plurality of games of chance based upon the characteristics of the product item, if the characteristics of the product item meets the criteria of at least one of the plurality of games of chance; and
   awarding the product item to the end-user, if the particular point in time is at or after the point in time assigned to at least one prize instance of the particular game of chance and the indicator of the at least one prize instance indicates the at least one prize instance is available to be awarded.

8. The non-transitory computer-readable medium according to claim 7, wherein the set of criteria comprises one selected from the group of: a product price range, a product category, a product manufacturer, a product brand and a product designer.

9. The non-transitory computer-readable medium according to claim 7, wherein the characteristics comprise one selected from the group of: a product price, a product category, a product manufacturer, a product brand, and a product designer.

10. The non-transitory computer-readable medium according to claim 7, wherein awarding the product item to the end-user comprises:
    setting the indicator of the at least one prize instance so that the at least one prize instance is no longer available to be awarded; and
    scheduling delivery of the product item to the end-user.

11. The non-transitory computer-readable medium according to claim 7, wherein the actions comprise:
    requesting information from the end-user regarding one or both of a reason for selecting the product item and a relationship of the end-user to an intended recipient of the product item; and
    updating one or both of personal interest and product preference information of the end-user maintained by the computer system, based upon the requested information.

12. The non-transitory computer-readable medium according to claim 7, wherein the actions comprise:
    determining whether the end-user has exhausted a set number of chances to win a prize within a set period of time; and
    entering the end-user into a different game of chance.

13. A system, the system comprising:
   a memory operable to store:
      a plurality of games of chance, wherein each game of chance comprises a respective starting point in time, a respective ending point in time, a respective maximum number of prizes to be awarded, and a respective set of criteria,
      a representation of a prize instance for each of the respective maximum number of prizes to be awarded, wherein the representation of each prize instance comprises a point in time assigned randomly within a time interval defined by the respective starting point in time and the respective ending point in time of each game of chance, and wherein the representation of the prize instance comprises an indicator representative of whether the prize instance is available to be awarded, and
      information identifying a product item, if the characteristics of the product item do not meet the criteria of any of the plurality of games of chance, wherein the information identifying a product item comprises information selected by an end-user while browsing an e-commerce web site, and wherein the e-commerce web site stores the information after the end-user leaves the e-commerce web site; and
   a processor operable to:
      receive, at a particular point in time, a request from the end-user to participate, wherein the request comprises information identifying the end-user and information identifying associated characteristics of the product item, determine whether the characteristics of the product item meet the criteria of any of the one or more games of chance, select a particular game of chance with the fewest criteria from the plurality of games of chance based upon the characteristics of the product item, if the characteristics of the product item meets the criteria of at least one of the plurality of games of chance, and award the product item to the end-user, if the particular point in time is at or after the point in time assigned to at least one prize instance of the particular game of chance and the indicator of the at least one prize instance indicates the at least one prize instance is available to be awarded.

14. The system according to claim 13, wherein the set of criteria comprises one selected from the group of: a product price range, a product category, a product manufacturer, a product brand and a product designer.

15. The system according to claim 13, wherein the characteristics comprise one selected from the group of: a product price, a product category, a product manufacturer, a product brand, and a product designer.

16. The system according to claim 13, wherein the processor is operable to:

set the indicator of the at least one prize instance so that the at least one prize instance is no longer available to be awarded, and schedule delivery of the product item to the end-user.

17. The system according to claim 13, wherein the processor is operable to:

request information from the end-user regarding one or both of a reason for selecting the product item and a relationship of the end-user to an intended recipient of the product item; and update one or both of personal interest and product preference information of the end-user maintained by the computer system, based upon the requested information.

18. The system according to claim 13, wherein the processor is operable to:

determine whether the end-user has exhausted a set number of chances to win a prize within a set period of time; and enter the end-user into a different game of chance.

* * * * *